United States Patent [19]

Westerink

[11] Patent Number: 5,577,134
[45] Date of Patent: Nov. 19, 1996

[54] METHOD AND APPARATUS FOR ENCODING A SEGMENTED IMAGE WITHOUT LOSS OF INFORMATION

[75] Inventor: Peter Westerink, Mount Laurel, N.J.

[73] Assignee: Panasonic Technologies, Inc., Secaucus, N.J.

[21] Appl. No.: 215,684

[22] Filed: Mar. 22, 1994

Related U.S. Application Data

[63] Continuation-in-part of Ser. No. 178,948, Jan. 7, 1994.

[51] Int. Cl.$^6$ .................................................... G06K 9/36
[52] U.S. Cl. ........................................ 382/240; 382/242
[58] Field of Search ........................ 382/56, 21, 19, 382/16, 22, 232, 197, 195, 190, 199, 240, 244, 242

[56] References Cited

U.S. PATENT DOCUMENTS

| | | | |
|---|---|---|---|
| 4,858,017 | 8/1989 | Torbey | 382/56 |
| 4,941,193 | 7/1990 | Barnsley et al. | 382/56 |
| 4,956,869 | 9/1990 | Miyatake et al. | 382/21 |
| 4,969,204 | 11/1990 | Melnychock et al. | 382/56 |
| 5,007,098 | 4/1991 | Kumagai | 382/21 |
| 5,341,442 | 8/1994 | Barrett | 382/56 |

OTHER PUBLICATIONS

Herbert Freeman, "Computer Processing of Line–Drawing Images", Computing Surveys, vol. 6, No. 1, pp. 57–97 (Mar. 1974).

T. Kaneko, "Hierarchical Coding of Line–Drawing Data Described by the Chain–Code Sequence", *System and Computers in Japan*, vol. 18, No. 4, pp. 53–62 (1987).

T. Westman et al., "Color Segmentation by Hierarchical Connected Components Analysis with Image Enhancement by Symmetric Neighborhood Filters", *IEEE*, pp. 796–802 (1990).

A. Montanvert, et al., "Hierarchical Image Analysis Using Irregular Tessellations", *IEEE Transactions on Pattern Analysis and Machine Intelligence*, vol. 13, No. 4, pp. 307–316 (Apr. 1991).

R. Sedgewick, "Algorithms", Addison–Wesley Publishing Company, pp. 393–398.

P. S. Heckberg, "A Seed Fill Algorithm", pp. 275–277.

T. Vlachos et al., "Graph–Theoretical Approach to Colour Picture Segmentation and Contour Classification", *IEEE Proceedings–I*, vol. 140, No. 1, pp. 36–45 (Feb. 1993).

L. Vincent et al., "Watersheds in Digital Spaces: An Efficient Algorithm Based on Immersion Simulations", *IEEE Transactions on Pattern Analysis and Machine Intelligence*, vol. 13, No. 6, pp. 583–598 (Jun. 1991).

*Primary Examiner*—Joseph Mancuso
*Assistant Examiner*—Gerard Del Rosso
*Attorney, Agent, or Firm*—Ratner & Prestia

[57] ABSTRACT

An image processing system encodes a segmented or mosaic image into a set of fixed-length data packets, from which the segmented image may be reproduced with no significant loss of detail. The exemplary system includes a chain coder which translates the segmented image into a form in which the image segments are represented as respective sequences of border values, each border value indicating a direction to the next border value. This image is further encoded such that each pair of border values becomes a single further border value and a pair of complementary codes. These further border values are processed in the same manner, to further reduce the number of border values needed to represent the image. When the number of border values has been reduced to a level such that the image may be encoded in a single packet, the encoding system provides these border values and all complementary code values that have been generated as the code representing the segmented image. Both the reduced border values and the complementary codes are variable-length coded before being stored for use by, or transmitted to an image reconstruction system.

9 Claims, 2 Drawing Sheets

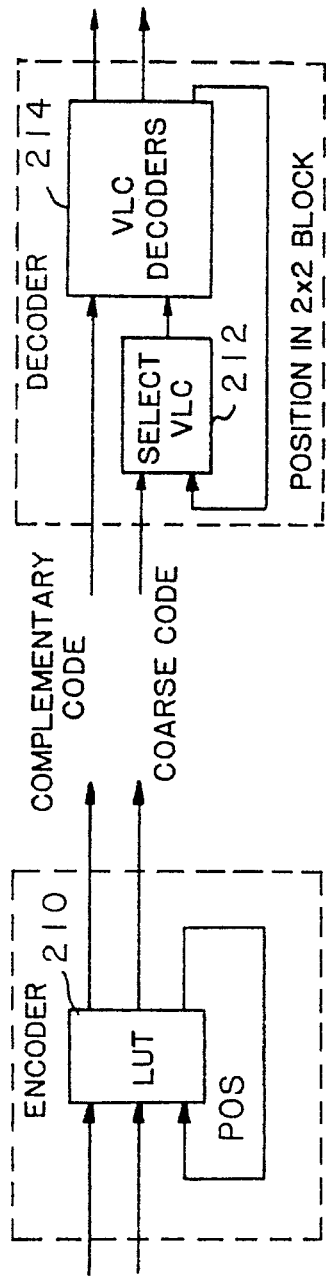
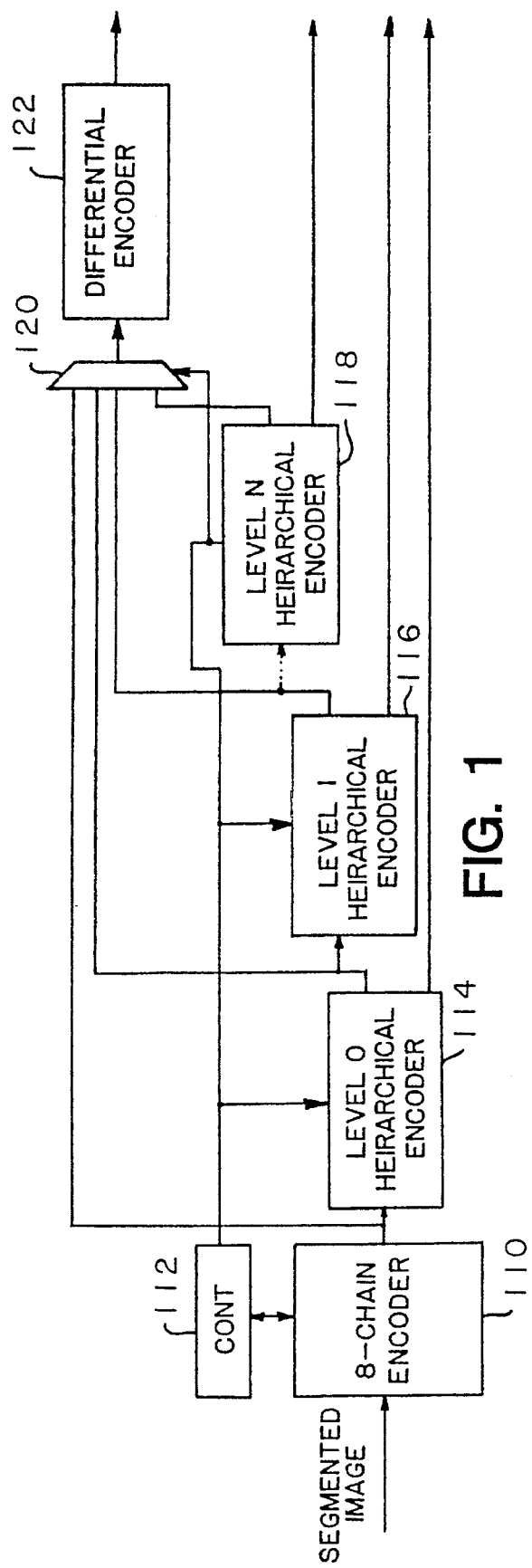

METHOD AND APPARATUS FOR ENCODING A SEGMENTED IMAGE WITHOUT LOSS OF INFORMATION

This application is a continuation in part of U.S. patent application Ser. No. 08/178,948 entitled SEGMENTATION BASED IMAGE COMPRESSION SYSTEM filed Jan. 7, 1994.

FIELD OF THE INVENTION

The present invention is directed to an image compression system which uses a segmented base image and, in particular, to apparatus and a method for losslessly encoding a segmented image.

BACKGROUND OF THE INVENTION

In the fields of image analysis and image compression, there are many applications for segmented images. As used herein, a segmented image is one which is made up of contiguous solid areas each having a single color and intensity. An example may be a cartoon drawing or a low-resolution version of a real-world image that is formed by reducing the real-world image to a collection of bounded areas and replacing each bounded area by its average value.

These images are useful for many different purposes. For example, object recognition in robot vision most closely mimics some aspects of human vision when the scene containing the objects is simplified into a segmented image. In addition, video compression applications in which an image may be subject to several cycles of compression and expansion may benefit from an image representation having, as a base component, a segmented image with well defined edges.

Another application for segmented images is digital image transmission. When, for example, a database of images is to be searched through a low-bandwidth channel, it may be desirable to provide a low-resolution image as the first step and then add detail to complete the image. Using this technique, a user may quickly determine, based only on the low-resolution component, if this is an image to be viewed. If not, the display of the image may be aborted before a significant amount of data has been transmitted through the channel.

One exemplary system for forming segmented images is disclosed in a paper by Vincent et al. entitled "Watersheds in Digital Spaces: An Efficient Algorithm Based on Immersion Simulations" *IEEE Transactions on Pattern Analysis and Machine Intelligence*, vol. 13, no. 6, Jun. 1991, pp 583–598. Another exemplary system is disclosed in a paper by T. Vlachos et al. entitled "Graph Theoretical Approach to Colour Picture Segmentation and Contour Classification" *IEEE Proceedings*-I vol 140, No. 1, Feb. 1993.

While each of these papers describes a method for generating a segmented image, neither addresses how such an image may be encoded for efficient storage. It is well known that a segmented image may be encoded using a chain-code technique. For example, the operation of an eight-chain is described in a paper by H. Freeman entitled "Computer Processing of Line Drawings" Computer Surveys, Vol. 6, No. 1, pp 57–97, March 1974, which is hereby incorporated by reference for its teachings on chain coding. The output data produced by this coder is a set of lists. Each list describes one area of constant color and constant brightness in the segmented image.

The entire set of lists describes the entire segmented image.

The algorithm assumes that an image is composed of discrete picture elements (pixels). To be effectively encoded using a chain code, the segmented image is desirably formed from discrete sets of contiguous pixel values, each set having a single luminance value, Y, and a single pair of color difference values, U and V. No particular method of forming the image is assumed; it may be raster scanned or generated from vectors.

Each list produced by the eight-chain code algorithm defines its area with a pair of color difference values, a luminance value for the area and an outline of the area. The outline begins and ends at a single pixel position. Only the address of this single starting pixel is contained in the list. Each other element of the outline portion of the list is a direction, relative to the current pixel, in which the next border pixel is to be found. This code is termed an eight-chain code because each element in the outline list may be one of eight directions, up, up-right, right, down-right, down, down-left, left and up-left relative to the current pixel.

The eight-chain code representation includes an element for each border pixel of each region in the image. Briefly, to generate an eight-chain code representation of a raster-scanned segmented image, the raster image is scanned until a border pixel is located. The address of this pixel is recorded in the list. The surrounding pixels are then scanned in a predetermined order to determine in which direction the next border pixel lies. This direction is recorded in the list. The identified next pixel then becomes the current pixel and its surrounding pixels are scanned to locate the next border pixel. The scanning of the surrounding pixels is in a predetermined rotational direction, either clockwise or counter-clockwise, such that the last pixel scanned is the previous border pixel. For abutting regions, the pixels on each side of the actual border are members of separate outline lists for a chain-code representation of an image.

Since each border pixel of each region is encoded by a chain-code algorithm, a border between two regions is encoded twice, once for each region. Thus, a chain-code representation of an image contains almost twice the number of pixels that are needed to describe all of the edges.

A crack encoding system such as described in the book by A. Rosenfeld et al. entitled *Digital Picture Processing*, Academic Press, New York, NY which is hereby incorporated by reference for its teachings on crack coding is another type of coding system which operates in a manner similar to a chain coding system. A crack coder encodes the image region outlines by defining the borders, or cracks, between adjoining regions. It encodes the these borders in four directions, up, right, down and left.

While, for a given image, a crack code representation of an image may be more compact than a chain code representation of the image, it is still not well suited for some types of digital image processing applications. For example, in the image database application described above, it would be desirable to be able to view a low-resolution version of an entire image based on data contained in a single packet or in a small number of packets transmitted over a network. While chain coding or crack coding may produce significant data reduction, neither technique can ensure that a segmented image can be reconstructed from a fixed amount of data.

SUMMARY OF THE INVENTION

The present invention is embodied in an image coding system in which a segmented image, that has been encoded to include lists of data values defining segment borders, is processed to produce a hierarchically encoded representation of the image having a fixed-size base representation of the image.

The system includes a control processor which analyzes an encoded image to determine an amount of data needed to represent the encoded image in a predetermined format. The system also includes at least one compression processor which encodes each N values in border list of the encoded image as a single sequence value and a complementary code value. The sequences produced by this compression processor define an encoded representation of the image having a lower resolution than the original image. This encoded image is applied to the compression processor, or to another compression processor, to produce another, even lower-resolution encoded version of the image and another complementary code. At each step in the process, the generated chain-coded image is applied to the control processor to determine if the generated image meets the size constraints. If so, the encoding of the image is complete. Otherwise, the encoded image is applied once again to a compression processor to produce a lower resolution version of the image.

When the encoding operation is complete, the result is a low-resolution encoded representation of the base segmented image and a sequence of complementary codes which may be combined with the base representation of the image to recover the original segmented image.

BRIEF DESCRIPTION OF THE DRAWINGS

FIG. 1 is a block diagram which illustrates the operation of a hierarchical lossless encoder according to the present invention.

FIGS. 2a and 2b are block diagrams of a single encoding stage and a single decoding stage, suitable for use with the encoder shown in FIG. 1.

DETAILED DESCRIPTION

Figure 3A:
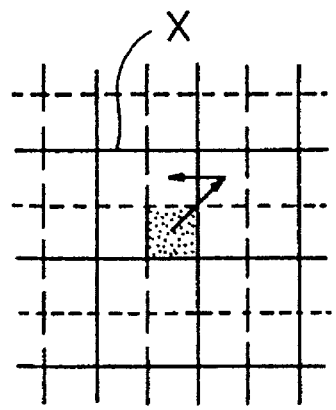
FIGS. 3a, 3b and 3c are diagrams of a portion of an image which are useful for describing the operation of the encoder shown in FIG. 1.

As described above, the goal of the hierarchical coder shown in FIG. 1 is to produce an encoded representation of a segmented image which may be stored in a single packet or a small number of packets. This packet may then be retrieved to generate a low-resolution image.

As shown in FIG. 1, an encoded segmented image is provided to an eight-chain coder 110 at the input port of the hierarchical encoder. The resulting chain-coded image is provided to the control processor 112. The control processor analyzes the image to determine whether it may be encoded, using standard lossless encoding techniques, to produce an amount of data that may fit into a single packet. In the exemplary embodiment of the invention, these lossless encoding techniques are the ones performed by the differential encoder 122, described below. If the size criteria are met, the control processor 112 enables the multiplexer 120 to pass the output signal of the chain coder 110 to the differential encoder 122. If the size criteria are not met, the chain-coded representation of the segmented image is compressed again to develop a coarse code image—which fits into a single packet—and a sequence of groups of complementary code values (comp. code 0 through comp. code n) which, when combined with the coarse code image, exactly reproduce the segmented image provided to the input port of the encoder 110.

Each stage of the hierarchical coder reduces the resolution of the image by mapping four picture elements (pixels) of the input image, which are arranged in a two-by-two block, into a single pixel of the coarse output image. The detail lost in the mapping process is maintained in pairs of vectors, each pair forming an element of the complementary code. The complementary code is further compressed by encoding the various pairs of vectors using a variable length code, such as a Huffman code.

One stage of the hierarchical coder may be implemented using circuitry such as that shown in FIG. 2a. In this Figure, a single input signal is applied to a look up table (LUT) 210. The LUT 210 also receives a feedback signal, POS, which indicates the position of the last encoded vector in one of the two-by-two blocks that make up the coarse image. These two signals, the current vector and the position of its starting point in a two-by-two block are applied as an address to the LUT 210. Responsive to this address value, the LUT 210 provides a coarse code, a complementary code, and a starting position for the next vector. The programming of the LUT is described in more detail below.

In the exemplary embodiment of the invention, The coarse code generated by the LUT has nine possible values, representing the vector directions: up, up-right, right, down-right, down, down-left, left, up-left and no change. The no change value is used for defining coarse blocks where the underlying change in the boundary pixel position is less than one coarse pixel.

Figure 3B:
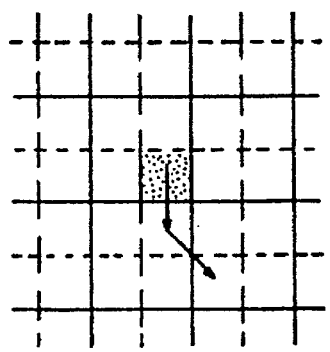
Figure 3C:
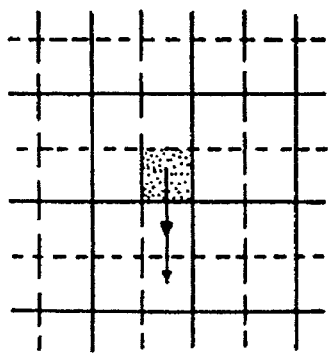

Examples of the operation of the hierarchical encoder are shown in FIGS. 3a, 3b and 3c. In these examples, the dashed lines and the solid lines define pixels at the fine (input signal) level while the solid lines alone define pixels at the coarse level. As shown in the Figures, each coarse pixel includes four fine pixels. In the LUT 210 for the hierarchical encoder shown in FIG. 2, the coarse code is one of the nine values listed above while the complementary code is a pair of fine pixel moves which define the path of the outline in the fine image relative to the coarse pixel move. Each coarse pixel move defines a set of variable length codes that are used to describe the pairs of fine pixel moves that correspond to the coarse move.

By processing a number of images, a frequency distribution of each pair of fine pixel moves for each coarse move can be tabulated and converted into a corresponding probability distribution. The variable length codes used to represent the pairs of fine moves are generated from this probability distribution such that the more probable pairs of fine moves are assigned to shorter length code words. It is noted that each coarse pixel move (coarse output of the hierarchical encoder) defines a separate probability distribution and so, a separate variable length code table to use to interpret the underlying pair of fine pixel moves.

The fine pixel line that is to be converted into the encoded coarse and complementary codes is defined by a starting pixel position in a coarse pixel block and two successive fine pixel move operations which define two segments of the edge, each segment being one fine pixel in length.

For example, in FIG. 3a, the starting position would be the bottom right corner of coarse pixel. x and the two moves would be up-right and left. For convenience, the positions in the coarse block are assigned numbers as shown in Table 1. In the same manner, the move directions are assigned numbers as shown in Table 2.

TABLE 1

| Block Position | Code |
| --- | --- |
| upper right | 0 |
| upper left | 1 |
| lower right | 2 |
| lower left | 3 |

TABLE 2

| Direction | Code |
| --- | --- |
| right | 0 |
| up | 1 |
| left | 2 |
| down | 3 |
| up-right | 4 |
| up-left | 5 |
| down-right | 6 |
| down-left | 7 |
| no change | 8 |

Appendix B describes a look-up-table suitable for use as the LUT 210 of FIG. 2. In Appendix B, the input values for the move illustrated in FIG. 3a would be 2 for the starting position and (4,2) for the move. The resulting coarse and complementary codes, as contained in Appendix B, are 8 (no change) and the binary code "110011", respectively. Using the same analysis, the input values for the move illustrated in FIG. 3b would be 2 for the starting positions and (3,6) for the move. The resulting coarse and complementary codes, again from Appendix B are, respectively, 6 (down-right) and the binary code "010". Finally, the move shown in FIG. 3c would be 2 for the starting position and (3,3) for the move. The resulting coarse and complementary codes from Appendix B are 3 (down) and the binary code "1".

As shown, FIG. 2a, the output value representing the position in the coarse block is fed back from the output to the input to sere as the starting position for the next conversion. The input values to the encoder 210 are two successive fine move directions from the outline list of the input chain codes. As shown in FIG. 1, the coarse output value provided by the level 0 hierarchical encoder 114 are the fine input values for the level 1 hierarchical encoder 116 and so on until the level N hierarchicalencoder. As described above, one of the coarse codes is selected as the output coarse code by the controller 112 and multiplexer 120. The selected coarse output values are applied to a differential encoder 122 which encodes the data using a predetermined variable length code to produce an output data stream. When the segmented image data has been processed, either by the eight-chain coder 110 or any of the hierarchical encoders 114 through 118, to a point that the differential coder 122 would produce a coarse code image that fits into a single packet, the controller 112 causes the multiplexer 120 to switch the output data provided by that coder to the input port of the differential coder 122. The controller 112 also controls the hierarchical coders 114 through 116 so that only the selected coders and coders below it in the hierarchy provide valid complementary codes. The combination of the coarse code and the valid complementary codes, if any exist, fully define the segmented image.

In the exemplary embodiment of the invention, the differential coder 122 generates a differential sequence for each border sequence applied to its input port. This differential sequence is generated by subtracting, from each element in the input sequence, the preceding element in the sequence. The resultant differential sequence is then encoded using a predetermined variable length code table to produce the representation of the image that is to be encoded in a single data packet.

This data is decoded using a system (not shown) which is the inverse of the encoder shown in FIG. 1.

In this system, a sequence of decoder circuits (not shown), such as the circuit shown in FIG. 2b are coupled to receive the complementary codes at one input port and a decoded coarse move direction at a second input port. The coarse code is used, in the circuitry 212 shown in FIG. 2b, to select a variable length code (VLC) which determines the performance of the VLC decoder 214. Using this variable length code, the decoder 214 decodes the encoded complementary code value to obtain two direction vectors. These direction vectors are the original direction vectors that generated the coarse-code and complementary code values in the encoder shown in FIG. 2a. These vectors, in turn, are applied as coarse codes, each with a respective complementary code, to the next level of the decoder. The initial level of the decoder (not shown) receives the encoded coarse code provided by the differential coder 122 and produces the coarse code input value for the decoder circuit which processes the complementary code generated by the highest level N hierarchical, 114 through 118, which was used to compress the segmented image into a single packet.

As shown in FIG. 1, the segmented image is compressed in two steps, first the raster image is encoded using a chain code. The resulting encoded image is then further compressed using a process which hierarchically decomposes the chain code into levels, each level representing a successively more coarse representation of the image. At each level, a complementary code is provided which represents the differences between the chain code at the current level and the chain code for the coarse image at the next level in the process.

Considering the combination of the coarse code and all of the complementary codes, further compression occurs only at level 0. The remaining levels slightly reduce the compression of the segmented image but significantly reduce the number of bits needed to represent the coarse code image.

The particular variable length code that is used is different for each coarse code value. Exemplary programmed values for the LUT's 2820 are given in the attached appendices A and B. The values in Appendix A are for a level-0 hierarchical encoder 114 and the values in Appendix B are for a hierarchical encoder at levels 1 through N (encoders 116 through 118).

While the invention has been described in terms of exemplary embodiments, it is contemplated that it may be practiced as outlined above within the spirit and scope of the appended claims.

APPENDIX A

| num | grp | blkpos | first dir | second dir | coarse dir | probab | complcode |
|---|---|---|---|---|---|---|---|
| 0 | 0 | 0 -> 0 | RIGHT | RIGHT | RIGHT | 0.7221 | 0 |
| 1 | 0 | 0 -> 2 | RIGHT | DOWN_RIGHT | RIGHT | 0.0921 | 110 |
| 2 | 0 | 0 -> 0 | UP_RIGHT | DOWN_RIGHT | RIGHT | 0.0075 | 1111 |
| 3 | 0 | 0 -> 2 | DOWN_RIGHT | RIGHT | RIGHT | 0.1538 | 10 |
| 4 | 0 | 0 -> 0 | DOWN_RIGHT | UP_RIGHT | RIGHT | 0.0245 | 1110 |
| 5 | 1 | 0 -> 3 | RIGHT | UP | UP | 0.0000 | |
| 6 | 1 | 0 -> 2 | RIGHT | UP_LEFT | UP | 0.0000 | |
| 7 | 1 | 0 -> 3 | UP | RIGHT | UP | 0.0620 | 1000 |
| 8 | 1 | 0 -> 0 | UP | UP | UP | 0.6655 | 0 |
| 9 | 1 | 0 -> 1 | UP | UP_RIGHT | UP | 0.0849 | 101 |
| 10 | 1 | 0 -> 2 | UP | NOCHANGE8 | UP | 0.0000 | |
| 11 | 1 | 0 -> 2 | LEFT | UP_RIGHT | UP | 0.0085 | 100101 |
| 12 | 1 | 0 -> 1 | UP_RIGHT | UP | UP | 0.1417 | 11 |
| 13 | 1 | 0 -> 2 | UP_RIGHT | LEFT | UP | 0.0000 | |
| 14 | 1 | 0 -> 0 | UP_RIGHT | UP_LEFT | UP | 0.0226 | 10011 |
| 15 | 1 | 0 -> 3 | UP_RIGHT | NOCHANGE8 | UP | 0.0000 | |
| 16 | 1 | 0 -> 2 | UP_LEFT | RIGHT | UP | 0.0080 | 1001000 |
| 17 | 1 | 0 -> 0 | UP_LEFT | UP_RIGHT | UP | 0.0069 | 1001001 |
| 18 | 1 | 0 -> 2 | NOCHANGE8 | UP | UP | 0.0000 | |
| 19 | 1 | 0 -> 3 | NOCHANGE8 | UP_RIGHT | UP | 0.0000 | |
| 20 | 2 | 0 -> 1 | UP | DOWN_LEFT | LEFT | 0.0000 | |
| 21 | 2 | 0 -> 0 | LEFT | LEFT | LEFT | 0.6737 | 0 |
| 22 | 2 | 0 -> 3 | LEFT | DOWN | LEFT | 0.0000 | |
| 23 | 2 | 0 -> 2 | LEFT | DOWN_LEFT | LEFT | 0.1391 | 11 |
| 24 | 2 | 0 -> 1 | LEFT | NOCHANGE8 | LEFT | 0.0000 | |
| 25 | 2 | 0 -> 3 | DOWN | LEFT | LEFT | 0.0628 | 1000 |
| 26 | 2 | 0 -> 1 | DOWN | UP_LEFT | LEFT | 0.0086 | 100101 |
| 27 | 2 | 0 -> 1 | UP_LEFT | DOWN | LEFT | 0.0000 | |
| 28 | 2 | 0 -> 0 | UP_LEFT | DOWN_LEFT | LEFT | 0.0229 | 10011 |
| 29 | 2 | 0 -> 1 | DOWN_LEFT | UP | LEFT | 0.0081 | 1001000 |
| 30 | 2 | 0 -> 2 | DOWN_LEFT | LEFT | LEFT | 0.0780 | 101 |
| 31 | 2 | 0 -> 0 | DOWN_LEFT | UP_LEFT | LEFT | 0.0070 | 1001001 |
| 32 | 2 | 0 -> 3 | DOWN_LEFT | NOCHANGE8 | LEFT | 0.0000 | |
| 33 | 2 | 0 -> 1 | NOCHANGE8 | LEFT | LEFT | 0.0000 | |
| 34 | 2 | 0 -> 3 | NOCHANGE8 | DOWN_LEFT | LEFT | 0.0000 | |
| 35 | 3 | 0 -> 0 | DOWN | DOWN | DOWN | 0.7318 | 0 |
| 36 | 3 | 0 -> 1 | DOWN | DOWN_RIGHT | DOWN | 0.1510 | 10 |
| 37 | 3 | 0 -> 1 | DOWN_RIGHT | DOWN | DOWN | 0.0847 | 110 |
| 38 | 3 | 0 -> 0 | DOWN_RIGHT | DOWN_LEFT | DOWN | 0.0076 | 1111 |
| 39 | 3 | 0 -> 0 | DOWN_LEFT | DOWN_RIGHT | DOWN | 0.0248 | 1110 |
| 40 | 4 | 0 -> 2 | RIGHT | UP_RIGHT | UP_RIGHT | 0.5073 | 0 |
| 41 | 4 | 0 -> 2 | UP_RIGHT | RIGHT | UP_RIGHT | 0.2845 | 10 |
| 42 | 4 | 0 -> 0 | UP_RIGHT | UP_RIGHT | UP_RIGHT | 0.2082 | 11 |
| 43 | 5 | 0 -> 3 | UP | LEFT | UP_LEFT | 0.0000 | |
| 44 | 5 | 0 -> 1 | UP | UP_LEFT | UP_LEFT | 0.2456 | 10 |
| 45 | 5 | 0 -> 3 | LEFT | UP | UP_LEFT | 0.1109 | 110 |
| 46 | 5 | 0 -> 2 | LEFT | UP_LEFT | UP_LEFT | 0.1517 | 000 |
| 47 | 5 | 0 -> 1 | UP_LEFT | UP | UP_LEFT | 0.1377 | 001 |
| 48 | 5 | 0 -> 2 | UP_LEFT | LEFT | UP_LEFT | 0.2534 | 01 |
| 49 | 5 | 0 -> 0 | UP_LEFT | UP_LEFT | UP_LEFT | 0.1008 | 111 |
| 50 | 5 | 0 -> 3 | UP_LEFT | NOCHANGE8 | UP_LEFT | 0.0000 | |
| 51 | 5 | 0 -> 3 | NOCHANGE8 | UP_LEFT | UP_LEFT | 0.0000 | |
| 52 | 6 | 0 -> 0 | DOWN_RIGHT | DOWN_RIGHT | DOWN_RIGHT | 1.0000 | |
| 53 | 7 | 0 -> 1 | DOWN | DOWN_LEFT | DOWN_LEFT | 0.2999 | 10 |
| 54 | 7 | 0 -> 1 | DOWN_LEFT | DOWN | DOWN_LEFT | 0.5009 | 0 |
| 55 | 7 | 0 -> 0 | DOWN_LEFT | DOWN_LEFT | DOWN_LEFT | 0.1992 | 11 |
| 56 | 8 | 0 -> 0 | RIGHT | LEFT | NOCHANGE8 | 0.0884 | 0011 |

| | | | | | | | | |
|---|---|---|---|---|---|---|---|---|
| 57 | 8 | 0 | -> 3 | RIGHT | DOWN | NOCHANGE8 | 0.4226 | 1 |
| 58 | 8 | 0 | -> 2 | RIGHT | DOWN_LEFT | NOCHANGE8 | 0.0577 | 0101 |
| 59 | 8 | 0 | -> 1 | RIGHT | NOCHANGE8 | NOCHANGE8 | 0.0000 | |
| 60 | 8 | 0 | -> 0 | UP | DOWN | NOCHANGE8 | 0.0884 | 0010 |
| 61 | 8 | 0 | -> 1 | UP | DOWN_RIGHT | NOCHANGE8 | 0.0577 | 0100 |
| 62 | 8 | 0 | -> 0 | LEFT | RIGHT | NOCHANGE8 | 0.0884 | 0001 |
| 63 | 8 | 0 | -> 2 | LEFT | DOWN_RIGHT | NOCHANGE8 | 0.0000 | |
| 64 | 8 | 0 | -> 3 | DOWN | RIGHT | NOCHANGE8 | 0.0000 | |
| 65 | 8 | 0 | -> 0 | DOWN | UP | NOCHANGE8 | 0.0884 | 0000 |
| 66 | 8 | 0 | -> 1 | DOWN | UP_RIGHT | NOCHANGE8 | 0.0000 | |
| 67 | 8 | 0 | -> 2 | DOWN | NOCHANGE8 | NOCHANGE8 | 0.0000 | |
| 68 | 8 | 0 | -> 1 | UP_RIGHT | DOWN | NOCHANGE8 | 0.0542 | 0111 |
| 69 | 8 | 0 | -> 0 | UP_RIGHT | DOWN_LEFT | NOCHANGE8 | 0.0000 | |
| 70 | 8 | 0 | -> 0 | UP_LEFT | DOWN_RIGHT | NOCHANGE8 | 0.0000 | |
| 71 | 8 | 0 | -> 1 | DOWN_RIGHT | UP | NOCHANGE8 | 0.0000 | |
| 72 | 8 | 0 | -> 2 | DOWN_RIGHT | LEFT | NOCHANGE8 | 0.0542 | 0110 |
| 73 | 8 | 0 | -> 0 | DOWN_RIGHT | UP_LEFT | NOCHANGE8 | 0.0000 | |
| 74 | 8 | 0 | -> 3 | DOWN_RIGHT | NOCHANGE8 | NOCHANGE8 | 0.0000 | |
| 75 | 8 | 0 | -> 2 | DOWN_LEFT | RIGHT | NOCHANGE8 | 0.0000 | |
| 76 | 8 | 0 | -> 0 | DOWN_LEFT | UP_RIGHT | NOCHANGE8 | 0.0000 | |
| 77 | 8 | 0 | -> 1 | NOCHANGE8 | RIGHT | NOCHANGE8 | 0.0000 | |
| 78 | 8 | 0 | -> 2 | NOCHANGE8 | DOWN | NOCHANGE8 | 0.0000 | |
| 79 | 8 | 0 | -> 3 | NOCHANGE8 | DOWN_RIGHT | NOCHANGE8 | 0.0000 | |
| 80 | 8 | 0 | -> 0 | NOCHANGE8 | NOCHANGE8 | NOCHANGE8 | 0.0000 | |
| 81 | 9 | 1 | -> 1 | RIGHT | RIGHT | RIGHT | 0.6655 | 0 |
| 82 | 9 | 1 | -> 2 | RIGHT | DOWN | RIGHT | 0.0620 | 1000 |
| 83 | 9 | 1 | -> 3 | RIGHT | DOWN_RIGHT | RIGHT | 0.0849 | 101 |
| 84 | 9 | 1 | -> 0 | RIGHT | NOCHANGE8 | RIGHT | 0.0000 | |
| 85 | 9 | 1 | -> 0 | UP | DOWN_RIGHT | RIGHT | 0.0085 | 100101 |
| 86 | 9 | 1 | -> 2 | DOWN | RIGHT | RIGHT | 0.0000 | |
| 87 | 9 | 1 | -> 0 | DOWN | UP_RIGHT | RIGHT | 0.0000 | |
| 88 | 9 | 1 | -> 0 | UP_RIGHT | DOWN | RIGHT | 0.0080 | 1001000 |
| 89 | 9 | 1 | -> 1 | UP_RIGHT | DOWN_RIGHT | RIGHT | 0.0069 | 1001001 |
| 90 | 9 | 1 | -> 3 | DOWN_RIGHT | RIGHT | RIGHT | 0.1417 | 11 |
| 91 | 9 | 1 | -> 0 | DOWN_RIGHT | UP | RIGHT | 0.0000 | |
| 92 | 9 | 1 | -> 1 | DOWN_RIGHT | UP_RIGHT | RIGHT | 0.0226 | 10011 |
| 93 | 9 | 1 | -> 2 | DOWN_RIGHT | NOCHANGE8 | RIGHT | 0.0000 | |
| 94 | 9 | 1 | -> 0 | NOCHANGE8 | RIGHT | RIGHT | 0.0000 | |
| 95 | 9 | 1 | -> 2 | NOCHANGE8 | DOWN_RIGHT | RIGHT | 0.0000 | |
| 96 | 10 | 1 | -> 3 | RIGHT | UP_LEFT | UP | 0.0000 | |
| 97 | 10 | 1 | -> 1 | UP | UP | UP | 0.6737 | 0 |
| 98 | 10 | 1 | -> 2 | UP | LEFT | UP | 0.0000 | |
| 99 | 10 | 1 | -> 0 | UP | UP_LEFT | UP | 0.1391 | 11 |
| 100 | 10 | 1 | -> 3 | UP | NOCHANGE8 | UP | 0.0000 | |
| 101 | 10 | 1 | -> 2 | LEFT | UP | UP | 0.0628 | 1000 |
| 102 | 10 | 1 | -> 3 | LEFT | UP_RIGHT | UP | 0.0086 | 100101 |
| 103 | 10 | 1 | -> 3 | UP_RIGHT | LEFT | UP | 0.0000 | |
| 104 | 10 | 1 | -> 1 | UP_RIGHT | UP_LEFT | UP | 0.0229 | 10011 |
| 105 | 10 | 1 | -> 3 | UP_LEFT | RIGHT | UP | 0.0081 | 1001000 |
| 106 | 10 | 1 | -> 0 | UP_LEFT | UP | UP | 0.0780 | 101 |
| 107 | 10 | 1 | -> 1 | UP_LEFT | UP_RIGHT | UP | 0.0070 | 1001001 |
| 108 | 10 | 1 | -> 2 | UP_LEFT | NOCHANGE8 | UP | 0.0000 | |
| 109 | 10 | 1 | -> 3 | NOCHANGE8 | UP | UP | 0.0000 | |
| 110 | 10 | 1 | -> 2 | NOCHANGE8 | UP_LEFT | UP | 0.0000 | |
| 111 | 11 | 1 | -> 1 | LEFT | LEFT | LEFT | 0.7318 | 0 |
| 112 | 11 | 1 | -> 3 | LEFT | DOWN_LEFT | LEFT | 0.1510 | 10 |
| 113 | 11 | 1 | -> 1 | UP_LEFT | DOWN_LEFT | LEFT | 0.0248 | 1110 |
| 114 | 11 | 1 | -> 3 | DOWN_LEFT | LEFT | LEFT | 0.0847 | 110 |
| 115 | 11 | 1 | -> 1 | DOWN_LEFT | UP_LEFT | LEFT | 0.0076 | 1111 |
| 116 | 12 | 1 | -> 1 | DOWN | DOWN | DOWN | 0.7221 | 0 |

| | | | | | | | | |
|---|---|---|---|---|---|---|---|---|
| 117 | 12 | 1 | -> 0 | DOWN | DOWN_LEFT | DOWN | 0.0921 | 110 |
| 118 | 12 | 1 | -> 1 | DOWN_RIGHT | DOWN_LEFT | DOWN | 0.0075 | 1111 |
| 119 | 12 | 1 | -> 0 | DOWN_LEFT | DOWN | DOWN | 0.1538 | 10 |
| 120 | 12 | 1 | -> 1 | DOWN_LEFT | DOWN_RIGHT | DOWN | 0.0245 | 1110 |
| 121 | 13 | 1 | -> 2 | RIGHT | UP | UP_RIGHT | 0.0000 | |
| 122 | 13 | 1 | -> 3 | RIGHT | UP_RIGHT | UP_RIGHT | 0.2456 | 10 |
| 123 | 13 | 1 | -> 2 | UP | RIGHT | UP_RIGHT | 0.1109 | 110 |
| 124 | 13 | 1 | -> 0 | UP | UP_RIGHT | UP_RIGHT | 0.1517 | 000 |
| 125 | 13 | 1 | -> 3 | UP_RIGHT | RIGHT | UP_RIGHT | 0.1377 | 001 |
| 126 | 13 | 1 | -> 0 | UP_RIGHT | UP | UP_RIGHT | 0.2534 | 01 |
| 127 | 13 | 1 | -> 1 | UP_RIGHT | UP_RIGHT | UP_RIGHT | 0.1008 | 111 |
| 128 | 13 | 1 | -> 2 | UP_RIGHT | NOCHANGE8 | UP_RIGHT | 0.0000 | |
| 129 | 13 | 1 | -> 2 | NOCHANGE8 | UP_RIGHT | UP_RIGHT | 0.0000 | |
| 130 | 14 | 1 | -> 3 | LEFT | UP_LEFT | UP_LEFT | 0.2999 | 10 |
| 131 | 14 | 1 | -> 3 | UP_LEFT | LEFT | UP_LEFT | 0.5009 | 0 |
| 132 | 14 | 1 | -> 1 | UP_LEFT | UP_LEFT | UP_LEFT | 0.1992 | 11 |
| 133 | 15 | 1 | -> 0 | DOWN | DOWN_RIGHT | DOWN_RIGHT | 0.5073 | 0 |
| 134 | 15 | 1 | -> 0 | DOWN_RIGHT | DOWN | DOWN_RIGHT | 0.2845 | 10 |
| 135 | 15 | 1 | -> 1 | DOWN_RIGHT | DOWN_RIGHT | DOWN_RIGHT | 0.2082 | 11 |
| 136 | 16 | 1 | -> 1 | DOWN_LEFT | DOWN_LEFT | DOWN_LEFT | 1.0000 | |
| 137 | 17 | 1 | -> 1 | RIGHT | LEFT | NOCHANGE8 | 0.0884 | 0011 |
| 138 | 17 | 1 | -> 3 | RIGHT | DOWN_LEFT | NOCHANGE8 | 0.0577 | 0101 |
| 139 | 17 | 1 | -> 1 | UP | DOWN | NOCHANGE8 | 0.0884 | 0010 |
| 140 | 17 | 1 | -> 0 | UP | DOWN_LEFT | NOCHANGE8 | 0.0000 | |
| 141 | 17 | 1 | -> 1 | LEFT | RIGHT | NOCHANGE8 | 0.0884 | 0001 |
| 142 | 17 | 1 | -> 2 | LEFT | DOWN | NOCHANGE8 | 0.0000 | |
| 143 | 17 | 1 | -> 3 | LEFT | DOWN_RIGHT | NOCHANGE8 | 0.0000 | |
| 144 | 17 | 1 | -> 0 | LEFT | NOCHANGE8 | NOCHANGE8 | 0.0000 | |
| 145 | 17 | 1 | -> 1 | DOWN | UP | NOCHANGE8 | 0.0884 | 0000 |
| 146 | 17 | 1 | -> 2 | DOWN | LEFT | NOCHANGE8 | 0.4226 | 1 |
| 147 | 17 | 1 | -> 0 | DOWN | UP_LEFT | NOCHANGE8 | 0.0577 | 0100 |
| 148 | 17 | 1 | -> 3 | DOWN | NOCHANGE8 | NOCHANGE8 | 0.0000 | |
| 149 | 17 | 1 | -> 1 | UP_RIGHT | DOWN_LEFT | NOCHANGE8 | 0.0000 | |
| 150 | 17 | 1 | -> 0 | UP_LEFT | DOWN | NOCHANGE8 | 0.0000 | |
| 151 | 17 | 1 | -> 1 | UP_LEFT | DOWN_RIGHT | NOCHANGE8 | 0.0000 | |
| 152 | 17 | 1 | -> 3 | DOWN_RIGHT | LEFT | NOCHANGE8 | 0.0542 | 0111 |
| 153 | 17 | 1 | -> 1 | DOWN_RIGHT | UP_LEFT | NOCHANGE8 | 0.0000 | |
| 154 | 17 | 1 | -> 3 | DOWN_LEFT | RIGHT | NOCHANGE8 | 0.0000 | |
| 155 | 17 | 1 | -> 0 | DOWN_LEFT | UP | NOCHANGE8 | 0.0542 | 0110 |
| 156 | 17 | 1 | -> 1 | DOWN_LEFT | UP_RIGHT | NOCHANGE8 | 0.0000 | |
| 157 | 17 | 1 | -> 2 | DOWN_LEFT | NOCHANGE8 | NOCHANGE8 | 0.0000 | |
| 158 | 17 | 1 | -> 0 | NOCHANGE8 | LEFT | NOCHANGE8 | 0.0000 | |
| 159 | 17 | 1 | -> 3 | NOCHANGE8 | DOWN | NOCHANGE8 | 0.0000 | |
| 160 | 17 | 1 | -> 2 | NOCHANGE8 | DOWN_LEFT | NOCHANGE8 | 0.0000 | |
| 161 | 17 | 1 | -> 1 | NOCHANGE8 | NOCHANGE8 | NOCHANGE8 | 0.0000 | |
| 162 | 18 | 2 | -> 2 | RIGHT | RIGHT | RIGHT | 0.7318 | 0 |
| 163 | 18 | 2 | -> 0 | RIGHT | UP_RIGHT | RIGHT | 0.1510 | 10 |
| 164 | 18 | 2 | -> 0 | UP_RIGHT | RIGHT | RIGHT | 0.0847 | 110 |
| 165 | 18 | 2 | -> 2 | UP_RIGHT | DOWN_RIGHT | RIGHT | 0.0076 | 1111 |
| 166 | 18 | 2 | -> 2 | DOWN_RIGHT | UP_RIGHT | RIGHT | 0.0248 | 1110 |
| 167 | 19 | 2 | -> 2 | UP | UP | UP | 0.7221 | 0 |
| 168 | 19 | 2 | -> 3 | UP | UP_RIGHT | UP | 0.0921 | 110 |
| 169 | 19 | 2 | -> 3 | UP_RIGHT | UP | UP | 0.1538 | 10 |
| 170 | 19 | 2 | -> 2 | UP_RIGHT | UP_LEFT | UP | 0.0245 | 1110 |
| 171 | 19 | 2 | -> 2 | UP_LEFT | UP_RIGHT | UP | 0.0075 | 1111 |
| 172 | 20 | 2 | -> 1 | UP | LEFT | LEFT | 0.0000 | |
| 173 | 20 | 2 | -> 3 | UP | DOWN_LEFT | LEFT | 0.0000 | |
| 174 | 20 | 2 | -> 1 | LEFT | UP | LEFT | 0.0620 | 1000 |
| 175 | 20 | 2 | -> 2 | LEFT | LEFT | LEFT | 0.6655 | 0 |
| 176 | 20 | 2 | -> 0 | LEFT | UP_LEFT | LEFT | 0.0849 | 101 |

| | | | | | | | | |
|---|---|---|---|---|---|---|---|---|
| 177 | 20 | 2 | -> | 3 | LEFT | NOCHANGE8 | LEFT | 0.0000 | |
| 178 | 20 | 2 | -> | 3 | DOWN | UP_LEFT | LEFT | 0.0085 | 100101 |
| 179 | 20 | 2 | -> | 0 | UP_LEFT | LEFT | LEFT | 0.1417 | 11 |
| 180 | 20 | 2 | -> | 3 | UP_LEFT | DOWN | LEFT | 0.0000 | |
| 181 | 20 | 2 | -> | 2 | UP_LEFT | DOWN_LEFT | LEFT | 0.0226 | 10011 |
| 182 | 20 | 2 | -> | 1 | UP_LEFT | NOCHANGE8 | LEFT | 0.0000 | |
| 183 | 20 | 2 | -> | 3 | DOWN_LEFT | UP | LEFT | 0.0080 | 1001000 |
| 184 | 20 | 2 | -> | 3 | DOWN_LEFT | UP_LEFT | LEFT | 0.0069 | 1001001 |
| 185 | 20 | 2 | -> | 3 | NOCHANGE8 | LEFT | LEFT | 0.0000 | |
| 186 | 20 | 2 | -> | 1 | NOCHANGE8 | UP_LEFT | LEFT | 0.0000 | |
| 187 | 21 | 2 | -> | 1 | RIGHT | DOWN | DOWN | 0.0628 | 1000 |
| 188 | 21 | 2 | -> | 0 | RIGHT | DOWN_LEFT | DOWN | 0.0086 | 100101 |
| 189 | 21 | 2 | -> | 0 | LEFT | DOWN_RIGHT | DOWN | 0.0000 | |
| 190 | 21 | 2 | -> | 1 | DOWN | RIGHT | DOWN | 0.0000 | |
| 191 | 21 | 2 | -> | 2 | DOWN | DOWN | DOWN | 0.6737 | 0 |
| 192 | 21 | 2 | -> | 3 | DOWN | DOWN_RIGHT | DOWN | 0.1391 | 11 |
| 193 | 21 | 2 | -> | 0 | DOWN | NOCHANGE8 | DOWN | 0.0000 | |
| 194 | 21 | 2 | -> | 0 | DOWN_RIGHT | LEFT | DOWN | 0.0081 | 1001000 |
| 195 | 21 | 2 | -> | 3 | DOWN_RIGHT | DOWN | DOWN | 0.0780 | 101 |
| 196 | 21 | 2 | -> | 2 | DOWN_RIGHT | DOWN_LEFT | DOWN | 0.0070 | 1001001 |
| 197 | 21 | 2 | -> | 1 | DOWN_RIGHT | NOCHANGE8 | DOWN | 0.0000 | |
| 198 | 21 | 2 | -> | 0 | DOWN_LEFT | RIGHT | DOWN | 0.0000 | |
| 199 | 21 | 2 | -> | 2 | DOWN_LEFT | DOWN_RIGHT | DOWN | 0.0229 | 10011 |
| 200 | 21 | 2 | -> | 0 | NOCHANGE8 | DOWN | DOWN | 0.0000 | |
| 201 | 21 | 2 | -> | 1 | NOCHANGE8 | DOWN_RIGHT | DOWN | 0.0000 | |
| 202 | 22 | 2 | -> | 2 | UP_RIGHT | UP_RIGHT | UP_RIGHT | 1.0000 | |
| 203 | 23 | 2 | -> | 3 | UP | UP_LEFT | UP_LEFT | 0.5073 | 0 |
| 204 | 23 | 2 | -> | 3 | UP_LEFT | UP | UP_LEFT | 0.2845 | 10 |
| 205 | 23 | 2 | -> | 2 | UP_LEFT | UP_LEFT | UP_LEFT | 0.2082 | 11 |
| 206 | 24 | 2 | -> | 0 | RIGHT | DOWN_RIGHT | DOWN_RIGHT | 0.2999 | 10 |
| 207 | 24 | 2 | -> | 0 | DOWN_RIGHT | RIGHT | DOWN_RIGHT | 0.5009 | 0 |
| 208 | 24 | 2 | ->. | 2 | DOWN_RIGHT | DOWN_RIGHT | DOWN_RIGHT | 0.1992 | 11 |
| 209 | 25 | 2 | -> | 1 | LEFT | DOWN | DOWN_LEFT | 0.0000 | |
| 210 | 25 | 2 | -> | 0 | LEFT | DOWN_LEFT | DOWN_LEFT | 0.2456 | 10 |
| 211 | 25 | 2 | -> | 1 | DOWN | LEFT | DOWN_LEFT | 0.1109 | 110 |
| 212 | 25 | 2 | -> | 3 | DOWN | DOWN_LEFT | DOWN_LEFT | 0.1517 | 000 |
| 213 | 25 | 2 | -> | 0 | DOWN_LEFT | LEFT | DOWN_LEFT | 0.1377 | 001 |
| 214 | 25 | 2 | -> | 3 | DOWN_LEFT | DOWN | DOWN_LEFT | 0.2534 | 01 |
| 215 | 25 | 2 | -> | 2 | DOWN_LEFT | DOWN_LEFT | DOWN_LEFT | 0.1008 | 111 |
| 216 | 25 | 2 | -> | 1 | DOWN_LEFT | NOCHANGE8 | DOWN_LEFT | 0.0000 | |
| 217 | 25 | 2 | -> | 1 | NOCHANGE8 | DOWN_LEFT | DOWN_LEFT | 0.0000 | |
| 218 | 26 | 2 | -> | 1 | RIGHT | UP | NOCHANGE8 | 0.0000 | |
| 219 | 26 | 2 | -> | 2 | RIGHT | LEFT | NOCHANGE8 | 0.0884 | 0011 |
| 220 | 26 | 2 | -> | 0 | RIGHT | UP_LEFT | NOCHANGE8 | 0.0000 | |
| 221 | 26 | 2 | -> | 3 | RIGHT | NOCHANGE8 | NOCHANGE8 | 0.0000 | |
| 222 | 26 | 2 | -> | 1 | UP | RIGHT | NOCHANGE8 | 0.4226 | 1 |
| 223 | 26 | 2 | -> | 2 | UP | DOWN | NOCHANGE8 | 0.0884 | 0010 |
| 224 | 26 | 2 | -> | 3 | UP | DOWN_RIGHT | NOCHANGE8 | 0.0577 | 0101 |
| 225 | 26 | 2 | -> | 0 | UP | NOCHANGE8 | NOCHANGE8 | 0.0000 | |
| 226 | 26 | 2 | -> | 2 | LEFT | RIGHT | NOCHANGE8 | 0.0884 | 0001 |
| 227 | 26 | 2 | -> | 0 | LEFT | UP_RIGHT | NOCHANGE8 | 0.0577 | 0100 |
| 228 | 26 | 2 | -> | 2 | DOWN | UP | NOCHANGE8 | 0.0884 | 0000 |
| 229 | 26 | 2 | -> | 3 | DOWN | UP_RIGHT | NOCHANGE8 | 0.0000 | |
| 230 | 26 | 2 | -> | 0 | UP_RIGHT | LEFT | NOCHANGE8 | 0.0000 | |
| 231 | 26 | 2 | -> | 3 | UP_RIGHT | DOWN | NOCHANGE8 | 0.0542 | 0111 |
| 232 | 26 | 2 | -> | 2 | UP_RIGHT | DOWN_LEFT | NOCHANGE8 | 0.0000 | |
| 233 | 26 | 2 | -> | 1 | UP_RIGHT | NOCHANGE8 | NOCHANGE8 | 0.0000 | |
| 234 | 26 | 2 | -> | 0 | UP_LEFT | RIGHT | NOCHANGE8 | 0.0542 | 0110 |
| 235 | 26 | 2 | -> | 2 | UP_LEFT | DOWN_RIGHT | NOCHANGE8 | 0.0000 | |
| 236 | 26 | 2 | -> | 3 | DOWN_RIGHT | UP | NOCHANGE8 | 0.0000 | |

| | | | | | | | |
|---|---|---|---|---|---|---|---|
| 237 | 26 | 2 -> 2 | DOWN_RIGHT | UP_LEFT | NOCHANGE8 | 0.0000 | |
| 238 | 26 | 2 -> 2 | DOWN_LEFT | UP_RIGHT | NOCHANGE8 | 0.0000 | |
| 239 | 26 | 2 -> 3 | NOCHANGE8 | RIGHT | NOCHANGE8 | 0.0000 | |
| 240 | 26 | 2 -> 0 | NOCHANGE8 | UP | NOCHANGE8 | 0.0000 | |
| 241 | 26 | 2 -> 1 | NOCHANGE8 | UP_RIGHT | NOCHANGE8 | 0.0000 | |
| 242 | 26 | 2 -> 2 | NOCHANGE8 | NOCHANGE8 | NOCHANGE8 | 0.0000 | |
| 243 | 27 | 3 -> 3 | RIGHT | RIGHT | RIGHT | 0.6737 | 0 |
| 244 | 27 | 3 -> 0 | RIGHT | UP | RIGHT | 0.0000 | |
| 245 | 27 | 3 -> 1 | RIGHT | UP_RIGHT | RIGHT | 0.1391 | 11 |
| 246 | 27 | 3 -> 2 | RIGHT | NOCHANGE8 | RIGHT | 0.0000 | |
| 247 | 27 | 3 -> 0 | UP | RIGHT | RIGHT | 0.0628 | 1000 |
| 248 | 27 | 3 -> 2 | UP | DOWN_RIGHT | RIGHT | 0.0086 | 100101 |
| 249 | 27 | 3 -> 2 | DOWN | UP_RIGHT | RIGHT | 0.0000 | |
| 250 | 27 | 3 -> 1 | UP_RIGHT | RIGHT | RIGHT | 0.0780 | 101 |
| 251 | 27 | 3 -> 2 | UP_RIGHT | DOWN | RIGHT | 0.0081 | 1001000 |
| 252 | 27 | 3 -> 3 | UP_RIGHT | DOWN_RIGHT | RIGHT | 0.0070 | 1001001 |
| 253 | 27 | 3 -> 0 | UP_RIGHT | NOCHANGE8 | RIGHT | 0.0000 | |
| 254 | 27 | 3 -> 2 | DOWN_RIGHT | UP | RIGHT | 0.0000 | |
| 255 | 27 | 3 -> 2 | DOWN_RIGHT | UP_RIGHT | RIGHT | 0.0229 | 10011 |
| 256 | 27 | 3 -> 2 | NOCHANGE8 | RIGHT | RIGHT | 0.0000 | |
| 257 | 27 | 3 -> 0 | NOCHANGE8 | UP_RIGHT | RIGHT | 0.0000 | |
| 258 | 28 | 3 -> 3 | UP | UP | UP | 0.7318 | 0 |
| 259 | 28 | 3 -> 2 | UP | UP_LEFT | UP | 0.1510 | 10 |
| 260 | 28 | 3 -> 3 | UP_RIGHT | UP_LEFT | UP | 0.0248 | 1110 |
| 261 | 28 | 3 -> 2 | UP_LEFT | UP | UP | 0.0847 | 110 |
| 262 | 28 | 3 -> 3 | UP_LEFT | UP_RIGHT | UP | 0.0076 | 1111 |
| 263 | 29 | 3 -> 3 | LEFT | LEFT | LEFT | 0.7221 | 0 |
| 264 | 29 | 3 -> 1 | LEFT | UP_LEFT | LEFT | 0.0921 | 110 |
| 265 | 29 | 3 -> 1 | UP_LEFT | LEFT | LEFT | 0.1538 | 10 |
| 266 | 29 | 3 -> 3 | UP_LEFT | DOWN_LEFT | LEFT | 0.0245 | 1110 |
| 267 | 29 | 3 -> 3 | DOWN_LEFT | UP_LEFT | LEFT | 0.0075 | 1111 |
| 268 | 30 | 3 -> 1 | RIGHT | DOWN_LEFT | DOWN | 0.0085 | 100101 |
| 269 | 30 | 3 -> 0 | LEFT | DOWN | DOWN | 0.0000 | |
| 270 | 30 | 3 -> 1 | LEFT | DOWN_RIGHT | DOWN | 0.0000 | |
| 271 | 30 | 3 -> 0 | DOWN | LEFT | DOWN | 0.0620 | 1000 |
| 272 | 30 | 3 -> 3 | DOWN | DOWN | DOWN | 0.6655 | 0 |
| 273 | 30 | 3 -> 2 | DOWN | DOWN_LEFT | DOWN | 0.0849 | 101 |
| 274 | 30 | 3 -> 1 | DOWN | NOCHANGE8 | DOWN | 0.0000 | |
| 275 | 30 | 3 -> 1 | DOWN_RIGHT | LEFT | DOWN | 0.0080 | 1001000 |
| 276 | 30 | 3 -> 3 | DOWN_RIGHT | DOWN_LEFT | DOWN | 0.0069 | 1001001 |
| 277 | 30 | 3 -> 1 | DOWN_LEFT | RIGHT | DOWN | 0.0000 | |
| 278 | 30 | 3 -> 2 | DOWN_LEFT | DOWN | DOWN | 0.1417 | 11 |
| 279 | 30 | 3 -> 3 | DOWN_LEFT | DOWN_RIGHT | DOWN | 0.0226 | 10011 |
| 280 | 30 | 3 -> 0 | DOWN_LEFT | NOCHANGE8 | DOWN | 0.0000 | |
| 281 | 30 | 3 -> 1 | NOCHANGE8 | DOWN | DOWN | 0.0000 | |
| 282 | 30 | 3 -> 0 | NOCHANGE8 | DOWN_LEFT | DOWN | 0.0000 | |
| 283 | 31 | 3 -> 2 | UP | UP_RIGHT | UP_RIGHT | 0.2999 | 10 |
| 284 | 31 | 3 -> 2 | UP_RIGHT | UP | UP_RIGHT | 0.5009 | 0 |
| 285 | 31 | 3 -> 3 | UP_RIGHT | UP_RIGHT | UP_RIGHT | 0.1992 | 11 |
| 286 | 32 | 3 -> 3 | UP_LEFT | UP_LEFT | UP_LEFT | 1.0000 | |
| 287 | 33 | 3 -> 0 | RIGHT | DOWN | DOWN_RIGHT | 0.1109 | 110 |
| 288 | 33 | 3 -> 1 | RIGHT | DOWN_RIGHT | DOWN_RIGHT | 0.1517 | 000 |
| 289 | 33 | 3 -> 0 | DOWN | RIGHT | DOWN_RIGHT | 0.0000 | |
| 290 | 33 | 3 -> 2 | DOWN | DOWN_RIGHT | DOWN_RIGHT | 0.2456 | 10 |
| 291 | 33 | 3 -> 1 | DOWN_RIGHT | RIGHT | DOWN_RIGHT | 0.2534 | 01 |
| 292 | 33 | 3 -> 2 | DOWN_RIGHT | DOWN | DOWN_RIGHT | 0.1377 | 001 |
| 293 | 33 | 3 -> 3 | DOWN_RIGHT | DOWN_RIGHT | DOWN_RIGHT | 0.1008 | 111 |
| 294 | 33 | 3 -> 0 | DOWN_RIGHT | NOCHANGE8 | DOWN_RIGHT | 0.0000 | |
| 295 | 33 | 3 -> 0 | NOCHANGE8 | DOWN_RIGHT | DOWN_RIGHT | 0.0000 | |
| 296 | 34 | 3 -> 1 | LEFT | DOWN_LEFT | DOWN_LEFT | 0.5073 | 0 |

| | | | | | | | | |
|---|---|---|---|---|---|---|---|---|
| 297 | 34 | 3 | -> | 1 | DOWN_LEFT | LEFT | DOWN_LEFT | 0.2845 | 10 |
| 298 | 34 | 3 | -> | 3 | DOWN_LEFT | DOWN_LEFT | DOWN_LEFT | 0.2082 | 11 |
| 299 | 35 | 3 | -> | 3 | RIGHT | LEFT | NOCHANGE8 | 0.0884 | 0011 |
| 300 | 35 | 3 | -> | 1 | RIGHT | UP_LEFT | NOCHANGE8 | 0.0000 | |
| 301 | 35 | 3 | -> | 0 | UP | LEFT | NOCHANGE8 | 0.0000 | |
| 302 | 35 | 3 | -> | 3 | UP | DOWN | NOCHANGE8 | 0.0884 | 0010 |
| 303 | 35 | 3 | -> | 2 | UP | DOWN_LEFT | NOCHANGE8 | 0.0000 | |
| 304 | 35 | 3 | -> | 1 | UP | NOCHANGE8 | NOCHANGE8 | 0.0000 | |
| 305 | 35 | 3 | -> | 3 | LEFT | RIGHT | NOCHANGE8 | 0.0884 | 0001 |
| 306 | 35 | 3 | -> | 0 | LEFT | UP | NOCHANGE8 | 0.4226 | 1 |
| 307 | 35 | 3 | -> | 1 | LEFT | UP_RIGHT | NOCHANGE8 | 0.0577 | 0101 |
| 308 | 35 | 3 | -> | 2 | LEFT | NOCHANGE8 | NOCHANGE8 | 0.0000 | |
| 309 | 35 | 3 | -> | 3 | DOWN | UP | NOCHANGE8 | 0.0884 | 0000 |
| 310 | 35 | 3 | -> | 2 | DOWN | UP_LEFT | NOCHANGE8 | 0.0577 | 0100 |
| 311 | 35 | 3 | -> | 1 | UP_RIGHT | LEFT | NOCHANGE8 | 0.0000 | |
| 312 | 35 | 3 | -> | 3 | UP_RIGHT | DOWN_LEFT | NOCHANGE8 | 0.0000 | |
| 313 | 35 | 3 | -> | 1 | UP_LEFT | RIGHT | NOCHANGE8 | 0.0542 | 0111 |
| 314 | 35 | 3 | -> | 2 | UP_LEFT | DOWN | NOCHANGE8 | 0.0000 | |
| 315 | 35 | 3 | -> | 3 | UP_LEFT | DOWN_RIGHT | NOCHANGE8 | 0.0000 | |
| 316 | 35 | 3 | -> | 0 | UP_LEFT | NOCHANGE8 | NOCHANGE8 | 0.0000 | |
| 317 | 35 | 3 | -> | 3 | DOWN_RIGHT | UP_LEFT | NOCHANGE8 | 0.0000 | |
| 318 | 35 | 3 | -> | 2 | DOWN_LEFT | UP | NOCHANGE8 | 0.0542 | 0110 |
| 319 | 35 | 3 | -> | 3 | DOWN_LEFT | UP_RIGHT | NOCHANGE8 | 0.0000 | |
| 320 | 35 | 3 | -> | 1 | NOCHANGE8 | UP | NOCHANGE8 | 0.0000 | |
| 321 | 35 | 3 | -> | 2 | NOCHANGE8 | LEFT | NOCHANGE8 | 0.0000 | |
| 322 | 35 | 3 | -> | 0 | NOCHANGE8 | UP_LEFT | NOCHANGE8 | 0.0000 | |
| 323 | 35 | 3 | -> | 3 | NOCHANGE8 | NOCHANGE8 | NOCHANGE8 | 0.0000 | |

APPENDIX R

| num | grp | blkpos | first dir | second dir | coarse dir | probab | complcode |
|---|---|---|---|---|---|---|---|
| 0 | 0 | 0 -> 0 | RIGHT | RIGHT | RIGHT | 0.7344 | 0 |
| 1 | 0 | 0 -> 2 | RIGHT | DOWN_RIGHT | RIGHT | 0.1064 | 100 |
| 2 | 0 | 0 -> 0 | UP_RIGHT | DOWN_RIGHT | RIGHT | 0.0141 | 1011 |
| 3 | 0 | 0 -> 2 | DOWN_RIGHT | RIGHT | RIGHT | 0.1228 | 11 |
| 4 | 0 | 0 -> 0 | DOWN_RIGHT | UP_RIGHT | RIGHT | 0.0224 | 1010 |
| 5 | 1 | 0 -> 3 | RIGHT | UP | UP | 0.0563 | 0101 |
| 6 | 1 | 0 -> 2 | RIGHT | UP_LEFT | UP | 0.0086 | 0110010 |
| 7 | 1 | 0 -> 3 | UP | RIGHT | UP | 0.0715 | 0011 |
| 8 | 1 | 0 -> 0 | UP | UP | UP | 0.4727 | 1 |
| 9 | 1 | 0 -> 1 | UP | UP_RIGHT | UP | 0.0685 | 0100 |
| 10 | 1 | 0 -> 2 | UP | NOCHANGE8 | UP | 0.0830 | 0001 |
| 11 | 1 | 0 -> 2 | LEFT | UP_RIGHT | UP | 0.0152 | 01111 |
| 12 | 1 | 0 -> 1 | UP_RIGHT | UP | UP | 0.0790 | 0010 |
| 13 | 1 | 0 -> 2 | UP_RIGHT | LEFT | UP | 0.0088 | 011101 |
| 14 | 1 | 0 -> 0 | UP_RIGHT | UP_LEFT | UP | 0.0144 | 011000 |
| 15 | 1 | 0 -> 3 | UP_RIGHT | NOCHANGE8 | UP | 0.0830 | 0000 |
| 16 | 1 | 0 -> 2 | UP_LEFT | RIGHT | UP | 0.0139 | 011010 |
| 17 | 1 | 0 -> 0 | UP_LEFT | UP_RIGHT | UP | 0.0091 | 011100 |
| 18 | 1 | 0 -> 2 | NOCHANGE8 | UP | UP | 0.0106 | 011011 |
| 19 | 1 | 0 -> 3 | NOCHANGE8 | UP_RIGHT | UP | 0.0053 | 0110011 |
| 20 | 2 | 0 -> 1 | UP | DOWN_LEFT | LEFT | 0.0086 | 011110 |
| 21 | 2 | 0 -> 0 | LEFT | LEFT | LEFT | 0.4732 | 1 |
| 22 | 2 | 0 -> 3 | LEFT | DOWN | LEFT | 0.0563 | 0110 |
| 23 | 2 | 0 -> 2 | LEFT | DOWN_LEFT | LEFT | 0.0766 | 0010 |
| 24 | 2 | 0 -> 1 | LEFT | NOCHANGE8 | LEFT | 0.0831 | 0001 |
| 25 | 2 | 0 -> 3 | DOWN | LEFT | LEFT | 0.0716 | 0011 |
| 26 | 2 | 0 -> 1 | DOWN | UP_LEFT | LEFT | 0.0152 | 010100 |
| 27 | 2 | 0 -> 1 | UP_LEFT | DOWN | LEFT | 0.0088 | 011101 |
| 28 | 2 | 0 -> 0 | UP_LEFT | DOWN_LEFT | LEFT | 0.0144 | 010101 |
| 29 | 2 | 0 -> 1 | DOWN_LEFT | UP | LEFT | 0.0140 | 010110 |
| 30 | 2 | 0 -> 2 | DOWN_LEFT | LEFT | LEFT | 0.0653 | 0100 |
| 31 | 2 | 0 -> 0 | DOWN_LEFT | UP_LEFT | LEFT | 0.0091 | 011100 |
| 32 | 2 | 0 -> 3 | DOWN_LEFT | NOCHANGE8 | LEFT | 0.0831 | 0000 |
| 33 | 2 | 0 -> 1 | NOCHANGE8 | LEFT | LEFT | 0.0138 | 010111 |
| 34 | 2 | 0 -> 3 | NOCHANGE8 | DOWN_LEFT | LEFT | 0.0069 | 011111 |
| 35 | 3 | 0 -> 0 | DOWN | DOWN | DOWN | 0.7411 | 0 |
| 36 | 3 | 0 -> 1 | DOWN | DOWN_RIGHT | DOWN | 0.1199 | 11 |
| 37 | 3 | 0 -> 1 | DOWN_RIGHT | DOWN | DOWN | 0.1022 | 100 |
| 38 | 3 | 0 -> 0 | DOWN_RIGHT | DOWN_LEFT | DOWN | 0.0142 | 1011 |
| 39 | 3 | 0 -> 0 | DOWN_LEFT | DOWN_RIGHT | DOWN | 0.0226 | 1010 |
| 40 | 4 | 0 -> 2 | RIGHT | UP_RIGHT | UP_RIGHT | 0.4624 | 1 |
| 41 | 4 | 0 -> 2 | UP_RIGHT | RIGHT | UP_RIGHT | 0.3942 | 00 |
| 42 | 4 | 0 -> 0 | UP_RIGHT | UP_RIGHT | UP_RIGHT | 0.1434 | 01 |
| 43 | 5 | 0 -> 3 | UP | LEFT | UP_LEFT | 0.1065 | 110 |
| 44 | 5 | 0 -> 1 | UP | UP_LEFT | UP_LEFT | 0.1448 | 010 |
| 45 | 5 | 0 -> 3 | LEFT | UP | UP_LEFT | 0.1353 | 011 |
| 46 | 5 | 0 -> 2 | LEFT | UP_LEFT | UP_LEFT | 0.1296 | 100 |
| 47 | 5 | 0 -> 1 | UP_LEFT | UP | UP_LEFT | 0.1235 | 101 |
| 48 | 5 | 0 -> 2 | UP_LEFT | LEFT | UP_LEFT | 0.1496 | 001 |
| 49 | 5 | 0 -> 0 | UP_LEFT | UP_LEFT | UP_LEFT | 0.0449 | 1110 |
| 50 | 5 | 0 -> 3 | UP_LEFT | NOCHANGE8 | UP_LEFT | 0.1571 | 000 |
| 51 | 5 | 0 -> 3 | NOCHANGE8 | UP_LEFT | UP_LEFT | 0.0086 | 1111 |
| 52 | 6 | 0 -> 0 | DOWN_RIGHT | DOWN_RIGHT | DOWN_RIGHT | 1.0000 | |
| 53 | 7 | 0 -> 1 | DOWN | DOWN_LEFT | DOWN_LEFT | 0.3999 | 00 |
| 54 | 7 | 0 -> 1 | DOWN_LEFT | DOWN | DOWN_LEFT | 0.4616 | 1 |
| 55 | 7 | 0 -> 0 | DOWN_LEFT | DOWN_LEFT | DOWN_LEFT | 0.1385 | 01 |
| 56 | 8 | 0 -> 0 | RIGHT | LEFT | NOCHANGE8 | 0.0328 | 00111 |

| | | | | | | | | |
|---|---|---|---|---|---|---|---|---|
| 57 | 8 | 0 | -> | 3 | RIGHT | DOWN | NOCHANGE8 | 0.1051 | 111 |
| 58 | 8 | 0 | -> | 2 | RIGHT | DOWN_LEFT | NOCHANGE8 | 0.0224 | 11011 |
| 59 | 8 | 0 | -> | 1 | RIGHT | NOCHANGE8 | NOCHANGE8 | 0.1220 | 101 |
| 60 | 8 | 0 | -> | 0 | UP | DOWN | NOCHANGE8 | 0.0328 | 11000 |
| 61 | 8 | 0 | -> | 1 | UP | DOWN_RIGHT | NOCHANGE8 | 0.0224 | 000000 |
| 62 | 8 | 0 | -> | 0 | LEFT | RIGHT | NOCHANGE8 | 0.0328 | 00110 |
| 63 | 8 | 0 | -> | 2 | LEFT | DOWN_RIGHT | NOCHANGE8 | 0.0126 | 110101 |
| 64 | 8 | 0 | -> | 3 | DOWN | RIGHT | NOCHANGE8 | 0.0827 | 0001 |
| 65 | 8 | 0 | -> | 0 | DOWN | UP | NOCHANGE8 | 0.0328 | 00101 |
| 66 | 8 | 0 | -> | 1 | DOWN | UP_RIGHT | NOCHANGE8 | 0.0126 | 110100 |
| 67 | 8 | 0 | -> | 2 | DOWN | NOCHANGE8 | NOCHANGE8 | 0.1220 | 100 |
| 68 | 8 | 0 | -> | 1 | UP_RIGHT | DOWN | NOCHANGE8 | 0.0205 | 000001 |
| 69 | 8 | 0 | -> | 0 | UP_RIGHT | DOWN_LEFT | NOCHANGE8 | 0.0029 | 000011011 |
| 70 | 8 | 0 | -> | 0 | UP_LEFT | DOWN_RIGHT | NOCHANGE8 | 0.0029 | 000011010 |
| 71 | 8 | 0 | -> | 1 | DOWN_RIGHT | UP | NOCHANGE8 | 0.0130 | 110011 |
| 72 | 8 | 0 | -> | 2 | DOWN_RIGHT | LEFT | NOCHANGE8 | 0.0205 | 000010 |
| 73 | 8 | 0 | -> | 0 | DOWN_RIGHT | UP_LEFT | NOCHANGE8 | 0.0029 | 000011001 |
| 74 | 8 | 0 | -> | 3 | DOWN_RIGHT | NOCHANGE8 | NOCHANGE8 | 0.1220 | 011 |
| 75 | 8 | 0 | -> | 2 | DOWN_LEFT | RIGHT | NOCHANGE8 | 0.0130 | 110010 |
| 76 | 8 | 0 | -> | 0 | DOWN_LEFT | UP_RIGHT | NOCHANGE8 | 0.0029 | 000011000 |
| 77 | 8 | 0 | -> | 1 | NOCHANGE8 | RIGHT | NOCHANGE8 | 0.0167 | 001001 |
| 78 | 8 | 0 | -> | 2 | NOCHANGE8 | DOWN | NOCHANGE8 | 0.0195 | 001000 |
| 79 | 8 | 0 | -> | 3 | NOCHANGE8 | DOWN_RIGHT | NOCHANGE8 | 0.0084 | 0000111 |
| 80 | 8 | 0 | -> | 0 | NOCHANGE8 | NOCHANGE8 | NOCHANGE8 | 0.1220 | 010 |
| 81 | 9 | 1 | -> | 1 | RIGHT | RIGHT | RIGHT | 0.4722 | 1 |
| 82 | 9 | 1 | -> | 2 | RIGHT | DOWN | RIGHT | 0.0714 | 0011 |
| 83 | 9 | 1 | -> | 3 | RIGHT | DOWN_RIGHT | RIGHT | 0.0684 | 0100 |
| 84 | 9 | 1 | -> | 0 | RIGHT | NOCHANGE8 | RIGHT | 0.0829 | 0001 |
| 85 | 9 | 1 | -> | 0 | UP | DOWN_RIGHT | RIGHT | 0.0152 | 01111 |
| 86 | 9 | 1 | -> | 2 | DOWN | RIGHT | RIGHT | 0.0562 | 0101 |
| 87 | 9 | 1 | -> | 0 | DOWN | UP_RIGHT | RIGHT | 0.0086 | 0110010 |
| 88 | 9 | 1 | -> | 0 | UP_RIGHT | DOWN | RIGHT | 0.0139 | 011010 |
| 89 | 9 | 1 | -> | 1 | UP_RIGHT | DOWN_RIGHT | RIGHT | 0.0091 | 011100 |
| 90 | 9 | 1 | -> | 3 | DOWN_RIGHT | RIGHT | RIGHT | 0.0790 | 0010 |
| 91 | 9 | 1 | -> | 0 | DOWN_RIGHT | UP | RIGHT | 0.0088 | 011101 |
| 92 | 9 | 1 | -> | 1 | DOWN_RIGHT | UP_RIGHT | RIGHT | 0.0144 | 011000 |
| 93 | 9 | 1 | -> | 2 | DOWN_RIGHT | NOCHANGE8 | RIGHT | 0.0829 | 0000 |
| 94 | 9 | 1 | -> | 0 | NOCHANGE8 | RIGHT | RIGHT | 0.0114 | 011011 |
| 95 | 9 | 1 | -> | 2 | NOCHANGE8 | DOWN_RIGHT | RIGHT | 0.0057 | 0110011 |
| 96 | 10 | 1 | -> | 3 | RIGHT | UP_LEFT | UP | 0.0087 | 0110100 |
| 97 | 10 | 1 | -> | 1 | UP | UP | UP | 0.4759 | 1 |
| 98 | 10 | 1 | -> | 2 | UP | LEFT | UP | 0.0566 | 0101 |
| 99 | 10 | 1 | -> | 0 | UP | UP_LEFT | UP | 0.0770 | 0010 |
| 100 | 10 | 1 | -> | 3 | UP | NOCHANGE8 | UP | 0.0835 | 0001 |
| 101 | 10 | 1 | -> | 2 | LEFT | UP | UP | 0.0720 | 0011 |
| 102 | 10 | 1 | -> | 3 | LEFT | UP_RIGHT | UP | 0.0153 | 01111 |
| 103 | 10 | 1 | -> | 3 | UP_RIGHT | LEFT | UP | 0.0089 | 011101 |
| 104 | 10 | 1 | -> | 1 | UP_RIGHT | UP_LEFT | UP | 0.0145 | 011000 |
| 105 | 10 | 1 | -> | 3 | UP_LEFT | RIGHT | UP | 0.0140 | 011001 |
| 106 | 10 | 1 | -> | 0 | UP_LEFT | UP | UP | 0.0656 | 0100 |
| 107 | 10 | 1 | -> | 1 | UP_LEFT | UP_RIGHT | UP | 0.0091 | 011100 |
| 108 | 10 | 1 | -> | 2 | UP_LEFT | NOCHANGE8 | UP | 0.0835 | 0000 |
| 109 | 10 | 1 | -> | 3 | NOCHANGE8 | UP | UP | 0.0106 | 011011 |
| 110 | 10 | 1 | -> | 2 | NOCHANGE8 | UP_LEFT | UP | 0.0046 | 0110101 |
| 111 | 11 | 1 | -> | 1 | LEFT | LEFT | LEFT | 0.7411 | 0 |
| 112 | 11 | 1 | -> | 3 | LEFT | DOWN_LEFT | LEFT | 0.1199 | 11 |
| 113 | 11 | 1 | -> | 1 | UP_LEFT | DOWN_LEFT | LEFT | 0.0226 | 1010 |
| 114 | 11 | 1 | -> | 3 | DOWN_LEFT | LEFT | LEFT | 0.1022 | 100 |
| 115 | 11 | 1 | -> | 1 | DOWN_LEFT | UP_LEFT | LEFT | 0.0142 | 1011 |
| 116 | 12 | 1 | -> | 1 | DOWN | DOWN | DOWN | 0.7344 | 0 |

| | | | | | | | |
|---|---|---|---|---|---|---|---|
| 117 | 12 | 1 -> 0 | DOWN | DOWN_LEFT | DOWN | 0.1064 | 100 |
| 118 | 12 | 1 -> 1 | DOWN_RIGHT | DOWN_LEFT | DOWN | 0.0141 | 1011 |
| 119 | 12 | 1 -> 0 | DOWN_LEFT | DOWN | DOWN | 0.1228 | 11 |
| 120 | 12 | 1 -> 1 | DOWN_LEFT | DOWN_RIGHT | DOWN | 0.0224 | 1010 |
| 121 | 13 | 1 -> 2 | RIGHT | UP | UP_RIGHT | 0.1064 | 110 |
| 122 | 13 | 1 -> 3 | RIGHT | UP_RIGHT | UP_RIGHT | 0.1446 | 010 |
| 123 | 13 | 1 -> 2 | UP | RIGHT | UP_RIGHT | 0.1351 | 011 |
| 124 | 13 | 1 -> 0 | UP | UP_RIGHT | UP_RIGHT | 0.1294 | 100 |
| 125 | 13 | 1 -> 3 | UP_RIGHT | RIGHT | UP_RIGHT | 0.1233 | 101 |
| 126 | 13 | 1 -> 0 | UP_RIGHT | UP | UP_RIGHT | 0.1494 | 001 |
| 127 | 13 | 1 -> 1 | UP_RIGHT | UP_RIGHT | UP_RIGHT | 0.0448 | 1110 |
| 128 | 13 | 1 -> 2 | UP_RIGHT | NOCHANGE8 | UP_RIGHT | 0.1569 | 000 |
| 129 | 13 | 1 -> 2 | NOCHANGE8 | UP_RIGHT | UP_RIGHT | 0.0101 | 1111 |
| 130 | 14 | 1 -> 3 | LEFT | UP_LEFT | UP_LEFT | 0.3999 | 00 |
| 131 | 14 | 1 -> 3 | UP_LEFT | LEFT | UP_LEFT | 0.4616 | 1 |
| 132 | 14 | 1 -> 1 | UP_LEFT | UP_LEFT | UP_LEFT | 0.1385 | 01 |
| 133 | 15 | 1 -> 0 | DOWN | DOWN_RIGHT | DOWN_RIGHT | 0.4624 | 1 |
| 134 | 15 | 1 -> 0 | DOWN_RIGHT | DOWN | DOWN_RIGHT | 0.3942 | 00 |
| 135 | 15 | 1 -> 1 | DOWN_RIGHT | DOWN_RIGHT | DOWN_RIGHT | 0.1434 | 01 |
| 136 | 16 | 1 -> 1 | DOWN_LEFT | DOWN_LEFT | DOWN_LEFT | 1.0000 | |
| 137 | 17 | 1 -> 1 | RIGHT | LEFT | NOCHANGE8 | 0.0326 | 00111 |
| 138 | 17 | 1 -> 3 | RIGHT | DOWN_LEFT | NOCHANGE8 | 0.0223 | 11011 |
| 139 | 17 | 1 -> 1 | UP | DOWN | NOCHANGE8 | 0.0326 | 11000 |
| 140 | 17 | 1 -> 0 | UP | DOWN_LEFT | NOCHANGE8 | 0.0126 | 110101 |
| 141 | 17 | 1 -> 1 | LEFT | RIGHT | NOCHANGE8 | 0.0326 | 00110 |
| 142 | 17 | 1 -> 2 | LEFT | DOWN | NOCHANGE8 | 0.0822 | 0001 |
| 143 | 17 | 1 -> 3 | LEFT | DOWN_RIGHT | NOCHANGE8 | 0.0126 | 110100 |
| 144 | 17 | 1 -> 0 | LEFT | NOCHANGE8 | NOCHANGE8 | 0.1213 | 101 |
| 145 | 17 | 1 -> 1 | DOWN | UP | NOCHANGE8 | 0.0326 | 00101 |
| 146 | 17 | 1 -> 2 | DOWN | LEFT | NOCHANGE8 | 0.1045 | 111 |
| 147 | 17 | 1 -> 0 | DOWN | UP_LEFT | NOCHANGE8 | 0.0223 | 000000 |
| 148 | 17 | 1 -> 3 | DOWN | NOCHANGE8 | NOCHANGE8 | 0.1213 | 100 |
| 149 | 17 | 1 -> 1 | UP_RIGHT | DOWN_LEFT | NOCHANGE8 | 0.0029 | 000001011 |
| 150 | 17 | 1 -> 0 | UP_LEFT | DOWN | NOCHANGE8 | 0.0129 | 110011 |
| 151 | 17 | 1 -> 1 | UP_LEFT | DOWN_RIGHT | NOCHANGE8 | 0.0029 | 000001010 |
| 152 | 17 | 1 -> 3 | DOWN_RIGHT | LEFT | NOCHANGE8 | 0.0204 | 000011 |
| 153 | 17 | 1 -> 1 | DOWN_RIGHT | UP_LEFT | NOCHANGE8 | 0.0029 | 000001001 |
| 154 | 17 | 1 -> 3 | DOWN_LEFT | RIGHT | NOCHANGE8 | 0.0129 | 110010 |
| 155 | 17 | 1 -> 0 | DOWN_LEFT | UP | NOCHANGE8 | 0.0204 | 000010 |
| 156 | 17 | 1 -> 1 | DOWN_LEFT | UP_RIGHT | NOCHANGE8 | 0.0029 | 000001000 |
| 157 | 17 | 1 -> 2 | DOWN_LEFT | NOCHANGE8 | NOCHANGE8 | 0.1213 | 011 |
| 158 | 17 | 1 -> 0 | NOCHANGE8 | LEFT | NOCHANGE8 | 0.0202 | 001000 |
| 159 | 17 | 1 -> 3 | NOCHANGE8 | DOWN | NOCHANGE8 | 0.0194 | 001001 |
| 160 | 17 | 1 -> 2 | NOCHANGE8 | DOWN_LEFT | NOCHANGE8 | 0.0100 | 0000011 |
| 161 | 17 | 1 -> 1 | NOCHANGE8 | NOCHANGE8 | NOCHANGE8 | 0.1213 | 010 |
| 162 | 18 | 2 -> 2 | RIGHT | RIGHT | RIGHT | 0.7411 | 0 |
| 163 | 18 | 2 -> 0 | RIGHT | UP_RIGHT | RIGHT | 0.1199 | 11 |
| 164 | 18 | 2 -> 0 | UP_RIGHT | RIGHT | RIGHT | 0.1022 | 100 |
| 165 | 18 | 2 -> 2 | UP_RIGHT | DOWN_RIGHT | RIGHT | 0.0142 | 1011 |
| 166 | 18 | 2 -> 2 | DOWN_RIGHT | UP_RIGHT | RIGHT | 0.0226 | 1010 |
| 167 | 19 | 2 -> 2 | UP | UP | UP | 0.7344 | 0 |
| 168 | 19 | 2 -> 3 | UP | UP_RIGHT | UP | 0.1064 | 100 |
| 169 | 19 | 2 -> 3 | UP_RIGHT | UP | UP | 0.1228 | 11 |
| 170 | 19 | 2 -> 2 | UP_RIGHT | UP_LEFT | UP | 0.0224 | 1010 |
| 171 | 19 | 2 -> 2 | UP_LEFT | UP_RIGHT | UP | 0.0141 | 1011 |
| 172 | 20 | 2 -> 1 | UP | LEFT | LEFT | 0.0561 | 0101 |
| 173 | 20 | 2 -> 3 | UP | DOWN_LEFT | LEFT | 0.0086 | 0110110 |
| 174 | 20 | 2 -> 1 | LEFT | UP | LEFT | 0.0713 | 0011 |
| 175 | 20 | 2 -> 2 | LEFT | LEFT | LEFT | 0.4716 | 1 |
| 176 | 20 | 2 -> 0 | LEFT | UP_LEFT | LEFT | 0.0683 | 0100 |

| 177 | 20 | 2 -> 3 | LEFT | NOCHANGE8 | LEFT | 0.0828 | 0001 |
| --- | --- | --- | --- | --- | --- | --- | --- |
| 178 | 20 | 2 -> 3 | DOWN | UP_LEFT | LEFT | 0.0152 | 01111 |
| 179 | 20 | 2 -> 0 | UP_LEFT | LEFT | LEFT | 0.0788 | 0010 |
| 180 | 20 | 2 -> 3 | UP_LEFT | DOWN | LEFT | 0.0088 | 011101 |
| 181 | 20 | 2 -> 2 | UP_LEFT | DOWN_LEFT | LEFT | 0.0144 | 011000 |
| 182 | 20 | 2 -> 1 | UP_LEFT | NOCHANGE8 | LEFT | 0.0828 | 0000 |
| 183 | 20 | 2 -> 3 | DOWN_LEFT | UP | LEFT | 0.0139 | 011001 |
| 184 | 20 | 2 -> 2 | DOWN_LEFT | UP_LEFT | LEFT | 0.0090 | 011100 |
| 185 | 20 | 2 -> 3 | NOCHANGE8 | LEFT | LEFT | 0.0138 | 011010 |
| 186 | 20 | 2 -> 1 | NOCHANGE8 | UP_LEFT | LEFT | 0.0045 | 0110111 |
| 187 | 21 | 2 -> 1 | RIGHT | DOWN | DOWN | 0.0717 | 0011 |
| 188 | 21 | 2 -> 0 | RIGHT | DOWN_LEFT | DOWN | 0.0153 | 01111 |
| 189 | 21 | 2 -> 0 | LEFT | DOWN_RIGHT | DOWN | 0.0086 | 0110010 |
| 190 | 21 | 2 -> 1 | DOWN | RIGHT | DOWN | 0.0564 | 0101 |
| 191 | 21 | 2 -> 2 | DOWN | DOWN | DOWN | 0.4741 | 1 |
| 192 | 21 | 2 -> 3 | DOWN | DOWN_RIGHT | DOWN | 0.0767 | 0010 |
| 193 | 21 | 2 -> 0 | DOWN | NOCHANGE8 | DOWN | 0.0832 | 0001 |
| 194 | 21 | 2 -> 0 | DOWN_RIGHT | LEFT | DOWN | 0.0140 | 011010 |
| 195 | 21 | 2 -> 3 | DOWN_RIGHT | DOWN | DOWN | 0.0654 | 0100 |
| 196 | 21 | 2 -> 2 | DOWN_RIGHT | DOWN_LEFT | DOWN | 0.0091 | 011100 |
| 197 | 21 | 2 -> 1 | DOWN_RIGHT | NOCHANGE8 | DOWN | 0.0832 | 0000 |
| 198 | 21 | 2 -> 0 | DOWN_LEFT | RIGHT | DOWN | 0.0089 | 011101 |
| 199 | 21 | 2 -> 2 | DOWN_LEFT | DOWN_RIGHT | DOWN | 0.0145 | 011000 |
| 200 | 21 | 2 -> 0 | NOCHANGE8 | DOWN | DOWN | 0.0133 | 011011 |
| 201 | 21 | 2 -> 1 | NOCHANGE8 | DOWN_RIGHT | DOWN | 0.0057 | 0110011 |
| 202 | 22 | 2 -> 2 | UP_RIGHT | UP_RIGHT | UP_RIGHT | 1.0000 | |
| 203 | 23 | 2 -> 3 | UP | UP_LEFT | UP_LEFT | 0.4624 | 1 |
| 204 | 23 | 2 -> 3 | UP_LEFT | UP | UP_LEFT | 0.3942 | 00 |
| 205 | 23 | 2 -> 2 | UP_LEFT | UP_LEFT | UP_LEFT | 0.1434 | 01 |
| 206 | 24 | 2 -> 0 | RIGHT | DOWN_RIGHT | DOWN_RIGHT | 0.3999 | 00 |
| 207 | 24 | 2 -> 0 | DOWN_RIGHT | RIGHT | DOWN_RIGHT | 0.4616 | 1 |
| 208 | 24 | 2 -> 2 | DOWN_RIGHT | DOWN_RIGHT | DOWN_RIGHT | 0.1385 | 01 |
| 209 | 25 | 2 -> 1 | LEFT | DOWN | DOWN_LEFT | 0.1060 | 110 |
| 210 | 25 | 2 -> 0 | LEFT | DOWN_LEFT | DOWN_LEFT | 0.1442 | 010 |
| 211 | 25 | 2 -> 1 | DOWN | LEFT | DOWN_LEFT | 0.1348 | 011 |
| 212 | 25 | 2 -> 3 | DOWN | DOWN_LEFT | DOWN_LEFT | 0.1291 | 100 |
| 213 | 25 | 2 -> 0 | DOWN_LEFT | LEFT | DOWN_LEFT | 0.1229 | 101 |
| 214 | 25 | 2 -> 3 | DOWN_LEFT | DOWN | DOWN_LEFT | 0.1490 | 001 |
| 215 | 25 | 2 -> 2 | DOWN_LEFT | DOWN_LEFT | DOWN_LEFT | 0.0447 | 1110 |
| 216 | 25 | 2 -> 1 | DOWN_LEFT | NOCHANGE8 | DOWN_LEFT | 0.1564 | 000 |
| 217 | 25 | 2 -> 1 | NOCHANGE8 | DOWN_LEFT | DOWN_LEFT | 0.0129 | 1111 |
| 218 | 26 | 2 -> 1 | RIGHT | UP | NOCHANGE8 | 0.0830 | 0001 |
| 219 | 26 | 2 -> 2 | RIGHT | LEFT | NOCHANGE8 | 0.0329 | 00111 |
| 220 | 26 | 2 -> 0 | RIGHT | UP_LEFT | NOCHANGE8 | 0.0127 | 110101 |
| 221 | 26 | 2 -> 3 | RIGHT | NOCHANGE8 | NOCHANGE8 | 0.1225 | 101 |
| 222 | 26 | 2 -> 1 | UP | RIGHT | NOCHANGE8 | 0.1055 | 111 |
| 223 | 26 | 2 -> 2 | UP | DOWN | NOCHANGE8 | 0.0329 | 00110 |
| 224 | 26 | 2 -> 3 | UP | DOWN_RIGHT | NOCHANGE8 | 0.0225 | 11011 |
| 225 | 26 | 2 -> 0 | UP | NOCHANGE8 | NOCHANGE8 | 0.1225 | 100 |
| 226 | 26 | 2 -> 2 | LEFT | RIGHT | NOCHANGE8 | 0.0329 | 00101 |
| 227 | 26 | 2 -> 0 | LEFT | UP_RIGHT | NOCHANGE8 | 0.0225 | 000000 |
| 228 | 26 | 2 -> 2 | DOWN | UP | NOCHANGE8 | 0.0329 | 00100 |
| 229 | 26 | 2 -> 3 | DOWN | UP_RIGHT | NOCHANGE8 | 0.0127 | 110100 |
| 230 | 26 | 2 -> 0 | UP_RIGHT | LEFT | NOCHANGE8 | 0.0130 | 110011 |
| 231 | 26 | 2 -> 3 | UP_RIGHT | DOWN | NOCHANGE8 | 0.0206 | 000001 |
| 232 | 26 | 2 -> 2 | UP_RIGHT | DOWN_LEFT | NOCHANGE8 | 0.0029 | 000011011 |
| 233 | 26 | 2 -> 1 | UP_RIGHT | NOCHANGE8 | NOCHANGE8 | 0.1225 | 011 |
| 234 | 26 | 2 -> 0 | UP_LEFT | RIGHT | NOCHANGE8 | 0.0206 | 000010 |
| 235 | 26 | 2 -> 2 | UP_LEFT | DOWN_RIGHT | NOCHANGE8 | 0.0029 | 000011010 |
| 236 | 26 | 2 -> 3 | DOWN_RIGHT | UP | NOCHANGE8 | 0.0130 | 110010 |

| | | | | | | | | |
|---|---|---|---|---|---|---|---|---|
| 237 | 26 | 2 | -> | 2 | DOWN_RIGHT | UP_LEFT | NOCHANGE8 | 0.0029 | 000011001 |
| 238 | 26 | 2 | -> | 2 | DOWN_LEFT | UP_RIGHT | NOCHANGE8 | 0.0029 | 000011000 |
| 239 | 26 | 2 | -> | 3 | NOCHANGE8 | RIGHT | NOCHANGE8 | 0.0168 | 110000 |
| 240 | 26 | 2 | -> | 0 | NOCHANGE8 | UP | NOCHANGE8 | 0.0156 | 110001 |
| 241 | 26 | 2 | -> | 1 | NOCHANGE8 | UP_RIGHT | NOCHANGE8 | 0.0079 | 0000111 |
| 242 | 26 | 2 | -> | 2 | NOCHANGE8 | NOCHANGE8 | NOCHANGE8 | 0.1225 | 010 |
| 243 | 27 | 3 | -> | 3 | RIGHT | RIGHT | RIGHT | 0.4751 | 1 |
| 244 | 27 | 3 | -> | 0 | RIGHT | UP | RIGHT | 0.0565 | 0101 |
| 245 | 27 | 3 | -> | 1 | RIGHT | UP_RIGHT | RIGHT | 0.0769 | 0010 |
| 246 | 27 | 3 | -> | 2 | RIGHT | NOCHANGE8 | RIGHT | 0.0834 | 0001 |
| 247 | 27 | 3 | -> | 0 | UP | RIGHT | RIGHT | 0.0718 | 0011 |
| 248 | 27 | 3 | -> | 2 | UP | DOWN_RIGHT | RIGHT | 0.0153 | 01111 |
| 249 | 27 | 3 | -> | 2 | DOWN | UP_RIGHT | RIGHT | 0.0086 | 0110010 |
| 250 | 27 | 3 | -> | 1 | UP_RIGHT | RIGHT | RIGHT | 0.0655 | 0100 |
| 251 | 27 | 3 | -> | 2 | UP_RIGHT | DOWN | RIGHT | 0.0140 | 011010 |
| 252 | 27 | 3 | -> | 3 | UP_RIGHT | DOWN_RIGHT | RIGHT | 0.0091 | 011100 |
| 253 | 27 | 3 | -> | 0 | UP_RIGHT | NOCHANGE8 | RIGHT | 0.0834 | 0000 |
| 254 | 27 | 3 | -> | 2 | DOWN_RIGHT | UP | RIGHT | 0.0089 | 011101 |
| 255 | 27 | 3 | -> | 3 | DOWN_RIGHT | UP_RIGHT | RIGHT | 0.0145 | 011000 |
| 256 | 27 | 3 | -> | 2 | NOCHANGE8 | RIGHT | RIGHT | 0.0114 | 011011 |
| 257 | 27 | 3 | -> | 0 | NOCHANGE8 | UP_RIGHT | RIGHT | 0.0054 | 0110011 |
| 258 | 28 | 3 | -> | 3 | UP | UP | UP | 0.7411 | 0 |
| 259 | 28 | 3 | -> | 2 | UP | UP_LEFT | UP | 0.1199 | 11 |
| 260 | 28 | 3 | -> | 3 | UP_RIGHT | UP_LEFT | UP | 0.0226 | 1010 |
| 261 | 28 | 3 | -> | 2 | UP_LEFT | UP | UP | 0.1022 | 100 |
| 262 | 28 | 3 | -> | 3 | UP_LEFT | UP_RIGHT | UP | 0.0142 | 1011 |
| 263 | 29 | 3 | -> | 3 | LEFT | LEFT | LEFT | 0.7344 | 0 |
| 264 | 29 | 3 | -> | 1 | LEFT | UP_LEFT | LEFT | 0.1064 | 100 |
| 265 | 29 | 3 | -> | 1 | UP_LEFT | LEFT | LEFT | 0.1228 | 11 |
| 266 | 29 | 3 | -> | 3 | UP_LEFT | DOWN_LEFT | LEFT | 0.0224 | 1010 |
| 267 | 29 | 3 | -> | 3 | DOWN_LEFT | UP_LEFT | LEFT | 0.0141 | 1011 |
| 268 | 30 | 3 | -> | 1 | RIGHT | DOWN_LEFT | DOWN | 0.0152 | 010100 |
| 269 | 30 | 3 | -> | 0 | LEFT | DOWN | DOWN | 0.0560 | 0110 |
| 270 | 30 | 3 | -> | 1 | LEFT | DOWN_RIGHT | DOWN | 0.0086 | 011110 |
| 271 | 30 | 3 | -> | 0 | DOWN | LEFT | DOWN | 0.0712 | 0011 |
| 272 | 30 | 3 | -> | 3 | DOWN | DOWN | DOWN | 0.4708 | 1 |
| 273 | 30 | 3 | -> | 2 | DOWN | DOWN_LEFT | DOWN | 0.0682 | 0100 |
| 274 | 30 | 3 | -> | 1 | DOWN | NOCHANGE8 | DOWN | 0.0826 | 0001 |
| 275 | 30 | 3 | -> | 1 | DOWN_RIGHT | LEFT | DOWN | 0.0139 | 010110 |
| 276 | 30 | 3 | -> | 3 | DOWN_RIGHT | DOWN_LEFT | DOWN | 0.0090 | 011100 |
| 277 | 30 | 3 | -> | 1 | DOWN_LEFT | RIGHT | DOWN | 0.0088 | 011101 |
| 278 | 30 | 3 | -> | 2 | DOWN_LEFT | DOWN | DOWN | 0.0787 | 0010 |
| 279 | 30 | 3 | -> | 3 | DOWN_LEFT | DOWN_RIGHT | DOWN | 0.0144 | 010101 |
| 280 | 30 | 3 | -> | 0 | DOWN_LEFT | NOCHANGE8 | DOWN | 0.0826 | 0000 |
| 281 | 30 | 3 | -> | 1 | NOCHANGE8 | DOWN | DOWN | 0.0132 | 010111 |
| 282 | 30 | 3 | -> | 0 | NOCHANGE8 | DOWN_LEFT | DOWN | 0.0068 | 011111 |
| 283 | 31 | 3 | -> | 2 | UP | UP_RIGHT | UP_RIGHT | 0.3999 | 00 |
| 284 | 31 | 3 | -> | 2 | UP_RIGHT | UP | UP_RIGHT | 0.4616 | 1 |
| 285 | 31 | 3 | -> | 3 | UP_RIGHT | UP_RIGHT | UP_RIGHT | 0.1385 | 01 |
| 286 | 32 | 3 | -> | 3 | UP_LEFT | UP_LEFT | UP_LEFT | 1.0000 | |
| 287 | 33 | 3 | -> | 0 | RIGHT | DOWN | DOWN_RIGHT | 0.1350 | 011 |
| 288 | 33 | 3 | -> | 1 | RIGHT | DOWN_RIGHT | DOWN_RIGHT | 0.1293 | 100 |
| 289 | 33 | 3 | -> | 0 | DOWN | RIGHT | DOWN_RIGHT | 0.1063 | 110 |
| 290 | 33 | 3 | -> | 2 | DOWN | DOWN_RIGHT | DOWN_RIGHT | 0.1445 | 010 |
| 291 | 33 | 3 | -> | 1 | DOWN_RIGHT | RIGHT | DOWN_RIGHT | 0.1493 | 001 |
| 292 | 33 | 3 | -> | 2 | DOWN_RIGHT | DOWN | DOWN_RIGHT | 0.1232 | 101 |
| 293 | 33 | 3 | -> | 3 | DOWN_RIGHT | DOWN_RIGHT | DOWN_RIGHT | 0.0448 | 1110 |
| 294 | 33 | 3 | -> | 0 | DOWN_RIGHT | NOCHANGE8 | DOWN_RIGHT | 0.1568 | 000 |
| 295 | 33 | 3 | -> | 0 | NOCHANGE8 | DOWN_RIGHT | DOWN_RIGHT | 0.0108 | 1111 |
| 296 | 34 | 3 | -> | 1 | LEFT | DOWN_LEFT | DOWN_LEFT | 0.4624 | 1 |

| | | | | | | | | |
|---|---|---|---|---|---|---|---|---|
| 297 | 34 | 3 | -> 1 | DOWN_LEFT | LEFT | DOWN_LEFT | 0.3942 | 00 |
| 298 | 34 | 3 | -> 3 | DOWN_LEFT | DOWN_LEFT | DOWN_LEFT | 0.1434 | 01 |
| 299 | 35 | 3 | -> 3 | RIGHT | LEFT | NOCHANGE8 | 0.0329 | 00111 |
| 300 | 35 | 3 | -> 1 | RIGHT | UP_LEFT | NOCHANGE8 | 0.0127 | 110101 |
| 301 | 35 | 3 | -> 0 | UP | LEFT | NOCHANGE8 | 0.0828 | 0001 |
| 302 | 35 | 3 | -> 3 | UP | DOWN | NOCHANGE8 | 0.0329 | 11000 |
| 303 | 35 | 3 | -> 2 | UP | DOWN_LEFT | NOCHANGE8 | 0.0127 | 110100 |
| 304 | 35 | 3 | -> 1 | UP | NOCHANGE8 | NOCHANGE8 | 0.1222 | 101 |
| 305 | 35 | 3 | -> 3 | LEFT | RIGHT | NOCHANGE8 | 0.0329 | 00110 |
| 306 | 35 | 3 | -> 0 | LEFT | UP | NOCHANGE8 | 0.1053 | 111 |
| 307 | 35 | 3 | -> 1 | LEFT | UP_RIGHT | NOCHANGE8 | 0.0224 | 11011 |
| 308 | 35 | 3 | -> 2 | LEFT | NOCHANGE8 | NOCHANGE8 | 0.1222 | 100 |
| 309 | 35 | 3 | -> 3 | DOWN | UP | NOCHANGE8 | 0.0329 | 00101 |
| 310 | 35 | 3 | -> 2 | DOWN | UP_LEFT | NOCHANGE8 | 0.0224 | 000000 |
| 311 | 35 | 3 | -> 1 | UP_RIGHT | LEFT | NOCHANGE8 | 0.0130 | 110011 |
| 312 | 35 | 3 | -> 3 | UP_RIGHT | DOWN_LEFT | NOCHANGE8 | 0.0029 | 001000011 |
| 313 | 35 | 3 | -> 1 | UP_LEFT | RIGHT | NOCHANGE8 | 0.0205 | 000001 |
| 314 | 35 | 3 | -> 2 | UP_LEFT | DOWN | NOCHANGE8 | 0.0130 | 110010 |
| 315 | 35 | 3 | -> 3 | UP_LEFT | DOWN_RIGHT | NOCHANGE8 | 0.0029 | 001000010 |
| 316 | 35 | 3 | -> 0 | UP_LEFT | NOCHANGE8 | NOCHANGE8 | 0.1222 | 011 |
| 317 | 35 | 3 | -> 3 | DOWN_RIGHT | UP_LEFT | NOCHANGE8 | 0.0029 | 001000001 |
| 318 | 35 | 3 | -> 2 | DOWN_LEFT | UP | NOCHANGE8 | 0.0205 | 000010 |
| 319 | 35 | 3 | -> 3 | DOWN_LEFT | UP_RIGHT | NOCHANGE8 | 0.0029 | 001000000 |
| 320 | 35 | 3 | -> 1 | NOCHANGE8 | UP | NOCHANGE8 | 0.0156 | 001001 |
| 321 | 35 | 3 | -> 2 | NOCHANGE8 | LEFT | NOCHANGE8 | 0.0204 | 000011 |
| 322 | 35 | 3 | -> 0 | NOCHANGE8 | UP_LEFT | NOCHANGE8 | 0.0067 | 0010001 |
| 323 | 35 | 3 | -> 3 | NOCHANGE8 | NOCHANGE8 | NOCHANGE8 | 0.1222 | 010 |

What is claimed:

1. Apparatus for encoding a segmented image to produce an output encoded image which may be decoded to reproduce an image which substantially matches the segmented image, said apparatus comprising:

means for processing the segmented image data to produce processed segmented image data which represents the image as a sequence of encoded segment borders, each border being represented by a sequence of displacements between respective border pixels that define a path around the border;

means for encoding the processed segmented image data to produce encoded segmented image data, in which each group of N values, where N is an integer, in each sequence of the processed segmented image is encoded into a single sequence value of the encoded segmented image data and a code value complementary to the encoded sequence value; and variable length encoding means for processing encoded segmented image data using a predetermined set of variable length codes to produce variable-length encoded data representing the segmented image, as the output encoded image.

2. Apparatus according to claim 1, wherein the means for processing the segmented image includes a chain coder which generates an eight-chain code representation of the segmented image as the processed segmented image.

3. Apparatus according to claim 1, wherein the means for encoding the processed segmented image includes a plurality of encoders, each encoder having an output and being coupled to receive a plurality of sequence values and to encode the plurality of sequence values into a single sequence value and a respective plurality of complementary code values, wherein the encoders are arranged hierarchically such that the processed segmented image is input to a first encoder, and the output of any one of the encoders is input to a subsequent encoder or to the variable length encoding means.

4. Apparatus according to claim 3, further including:

control means for monitoring the sequence values provided by each of the plurality of encoders to determine if the sequence values provided by any one of the encoders may be encoded, by the variable length encoding means, to represent the segmented image as a predetermined number of output encoded data values; and means, coupled to receive the sequences of values provided by the plurality of encoders and responsive to the control means, for coupling one of the encoders to the variable length encoding means, said coupled encoder being one of the encoders determined by the control means to produce sequence values which, when variable length encoded, represent the segmented image as a predetermined number of output encoded data values.

5. Apparatus according to claim 4, wherein the variable length encoding means includes:

a differential coder which represents each sequence value as a difference relative to a preceding sequence value, and variable length encoding means for encoding the difference values provided by the differential coder to produce the output encoded image.

6. Apparatus according to claim 5, wherein each of the encoding means includes variable length encoding means for representing N complementary codes as a single variable length code value, said code value being dependent on the single sequence value produced by the encoding means responsive to the sequence values provided to the encoding means.

7. A method of encoding a segmented image to produce an output encoded image which may be decoded to reproduce an image which substantially matches the segmented image, said method comprising the steps of:

processing the segmented image to produce a description of the image as a sequence of encoded segment borders, each border being represented by a sequence of displacements between respective border pixels that define a path around the border, to produce a processed segmented image;

encoding the processed segmented image to produce an encoded segmented image, in which each group of N values, where N is an integer, in each sequence of the processed segmented image is encoded into a single sequence value and a code value complementary to the encoded sequence value; and variable length encoding the complementary code value and the single sequence values using a predetermined set of variable length codes to produce variable-length encoded data representing the segmented image, as the output encoded image.

8. A method according to claim 7, wherein the step of encoding the processed segmented image includes the steps of:

a) encoding each pair of segment values of the processed segmented image into a single reduced-resolution sequence value and a pair of complementary code values;

b) encoding each pair of reduced-resolution sequence values into a single further reduced resolution sequence values and a further pair of complementary code values;

c) variable length encoding the pair of complementary code values into a variable length code value; and d) variable length encoding the further pair of complementary code values into a further variable length code value.

9. A method according to claim 8, wherein the step of processing the segmented image to produce a description of the image as a sequence of encoded segment borders includes the step of chain coding the segmented image in accordance with an eight-chain code.

\* \* \* \* \*